United States Patent [19]
Corbett et al.

[11] Patent Number: 5,469,700
[45] Date of Patent: Nov. 28, 1995

[54] TURBINE ENGINE CONTROL SYSTEM

[75] Inventors: Nicholas C. Corbett, Solihull; Norman P. Lines, Warwickshire, both of England

[73] Assignee: Rolls-Royce plc, London, England

[21] Appl. No.: 211,493

[22] PCT Filed: Oct. 29, 1992

[86] PCT No.: PCT/GB92/01982

§ 371 Date: Jul. 7, 1994

§ 102(e) Date: Jul. 7, 1994

[87] PCT Pub. No.: WO93/09339

PCT Pub. Date: May 13, 1993

[30] Foreign Application Priority Data

Oct. 29, 1991 [GB] United Kingdom ............... 9122965

[51] Int. Cl.$^6$ ........................................ F02C 9/28
[52] U.S. Cl. .................. 60/39.06; 60/39.281; 60/746
[58] Field of Search ............... 60/39.06, 39.281, 60/733, 746, 747

[56] References Cited

U.S. PATENT DOCUMENTS

| | | | |
|---|---|---|---|
| 3,520,133 | 7/1970 | Loft ............................... | 60/39.281 |
| 4,100,731 | 7/1978 | Janes et al. . | |
| 4,112,676 | 9/1978 | DeCorso ........................... | 60/746 |
| 4,603,548 | 8/1986 | Ishibashi et al. ................... | 60/746 |
| 4,910,957 | 3/1990 | Moreno et al. . | |
| 5,069,029 | 12/1991 | Kuroda et al. . | |
| 5,083,277 | 1/1992 | Shutler . | |
| 5,257,502 | 11/1993 | Napoli ............................. | 60/747 |
| 5,303,542 | 4/1994 | Hoffa .............................. | 60/746 |

FOREIGN PATENT DOCUMENTS

| | | |
|---|---|---|
| 126333 | 6/1986 | Japan ............................ 60/746 |
| 2057577 | 4/1981 | United Kingdom . |
| 2057576 | 4/1981 | United Kingdom . |
| WO92/07221 | 4/1992 | WIPO . |

OTHER PUBLICATIONS

Owen, D. A. et al., "Low Emissions Combustor Design Options for an Aero Derived Industrial Gas Turbine," Canadian Gas Association Symposium on Industrial Application of Gas Turbines, Banff, Alberta, Oct. 16–18, 1991.

Primary Examiner—Louis J. Casaregola
Attorney, Agent, or Firm—Oliff & Berridge

[57] ABSTRACT

Fuel flow is scheduled to a plurality of combustion stages by putting a plurality of engine fuel flow governors in parallel with each other and letting the governor which outputs the lowest fuel demand signal be the one which schedules the total fuel flow to the engine. Fuel flows to the plurality of combustion stages are then individually schedulled to achieve the lowest fuel flows consistent with predefined temperature limits for the corresponding stages of combustion.

10 Claims, 16 Drawing Sheets

TURBINE ENGINE CONTROL SYSTEM

This invention relates to a fuel control system for a gas turbine engine, particularly an engine whose combustion system has been designed with a view to reducing emission levels of pollutants in its exhaust gases.

There is currently worldwide awareness of the need to limit the pollutants emitted from fossil fuelled engines. This concern is being expressed in terms of increasingly strict legislation in the leading industrial countries.

Pollutants emitted from gas turbine engines are directly related to the temperature at which the air and fuel reactants are burnt in their combustion systems. The principle pollutants are emissions of nitrous oxides (NOx), which begin forming at high temperatures and increase exponentially with increasing temperature, carbon monoxide (CO), and unburned hydrocarbons (UHC). Both the latter two pollutants are produced due to incomplete or weak combustion, typically at low combustion temperatures.

Current technology adopted to meet stricter NOx emission standards includes water or steam injection into appropriately modified conventional types of gas turbine engine combustors. However, this expedient does not necessarily enable the engines to meet all CO limits. A further difficulty with water or steam injection is that it may not be practical in remote or arid locations to provide an adequate supply of suitable water.

It has therefore been necessary to design and develop combustors using alternative combustion techniques which enable combustion temperatures to be kept within certain limits known to substantially avoid pollutant production. The two available techniques are "rich burn rapid quench" and "premix lean burn" and both accomplish the objective by avoiding the high temperatures generated at near-stoichiometric conditions. The terms "rich" and "lean" convey the magnitude of the air/fuel mixture strength with respect to stoichiometric combustion conditions.

One design of combustor employing the premix lean burn technique is shown in copending International patent application number PCT/GB91/01658, having the International publication number WO92/07221, which is hereby incorporated by reference. In this design, combustion occurs in one, two or three successive stages according to the ambient temperature and the power levels being produced. At each stage, controlled amounts of fuel and air are injected, mixed together and burnt in particular ways as disclosed in the patent application and as also described later in this specification. This strategy enables much reduced emissions of NOx, CO and UHC compared to conventional combustors.

One of the problems inherent in employing "lean" fuel/air mixtures is that they necessitate operating the combustion system in close proximity to the reactants' weak extinction limit. Therefore, to provide low emissions over a wide operating range demands that the air/fuel ratio is modulated in some way to sustain combustion, particularly at part-load conditions, where the mixture would otherwise be too weak to burn. The use of staged combustion provides a means of subdividing the expansion of the combustion reactants into a number of smaller, easier to manage, processes. Thus, air/fuel ratios in each stage can be individually set, thereby effectively achieving the desirable modulation of the air/fuel ratio for the overall process without recourse to potentially unreliable variable geometry hardware features for changing airflows through the combustor. Of course, to meet the pollutant emission targets, the combustion temperature within each of these stages must be controlled within the correct narrow temperature bands.

It is an object of the present invention to provide an improved form of fuel control system for regulating fuel flow to a plurality of combustion stages in combustors employing premix lean burn staged combustion techniques.

It is a further object of the invention to provide an improved method of regulating fuel flow to such a staged combustor.

Another object of the invention is to limit the production of $NO_x$, CO and UHC emissions in staged combustion systems by controlling the combustion temperature within limits which are specified for particular combustors and fuels.

Yet another object of the invention is to provide a fuel control system for a staged combustor to enable controlled changeover between a diffusion flame and a lean burn type of combustion.

According to the present invention, a method of scheduling fuel flow to a plurality of combustion stages comprises putting a plurality of engine fuel flow governors in parallel with each other and letting the governor which outputs the lowest fuel demand signal be the one which schedules the total fuel flow to the engine, fuel flows to the plurality of combustion stages then being individually scheduled to achieve the lowest fuel flows consistent with predefined temperature limits for the corresponding stages of combustion.

Overview of Series Staged Combustion and Control

The series staged combustor design referred to above consists essentially of a number of separate combustion zones arranged in cascade, each independently fuelled, where the fuelling and the required number of active stages depends upon the ambient temperature and upon the power required from the power turbine. Cascading the combustion products between successive stages reduces the magnitude of the temperature rise required in the secondary and tertiary stages and significantly improves their weak extinction margins. This extends the power range over which the premix lean burn combustion process can be used.

However, the primary stage does not receive any preheat, and as the air at entry to the primary stage is at a relatively low temperature (650°–750° K.), its operating power range is small. This characteristic is compensated for by ensuring that whenever the combustor is operating in low emissions mode, i.e. premix lean burn, the secondary stage is always active along with the primary stage, thereby achieving low emissions over a wider power range. In addition, the primary stage is designed to operate at a substantially constant combustion temperature, so that its stability margin is not dependant on operating conditions.

To extend the power range further necessitates an increased number of premix lean burn stages, but as the air supply to the combustor is limited, an optimum number of stages is determined, e.g. two or three.

At engine starting and low power operation, the lean burn combustion mode is not practicable, and at such conditions, a diffusion flame type of combustion is utilised in the primary combustion region, instead of the premix lean burn combustion.

The above described method and apparatus for performing lean burn staged combustion is based upon selecting the number of active stages and controlling the combustion process within the designed temperature limits. To avoid the need to measure combustion temperatures directly, which would entail closed loop feedback, the control system utilises an open loop technique in which the combustion temperature is determined from the thermodynamic properties of the air and fuel reactants. Therefore, measurement of characteristics for each combustor stage, such as ambient air temperature and humidity, air temperature before entry to the combustor, and air and fuel mass flow rates, allows the control system to compute and modulate the separate fuel flows to perform the required control of combustion temperature in each stage.

As well known in the industry, air and fuel equivalence ratio relationships can be used to determine the combustion temperature rise for various air/fuel ratios. Only prior knowledge of the stoichiometric air/fuel ratio for the particular fuel being burnt is required. Plainly, where the composition of the fuel is known, this can be included in the calculations. However, it has been found that prior knowledge of composition for some groups of related fuels, such as pipeline natural gases, is not necessary. This is because it has been found that compositional variations among such fuels cause only small variations in stoichiometric air/fuel ratio, with the result that temperature control errors introduced by ignoring variations in fuel composition are found to be only about 10° K.

In the present invention, the limiting temperatures of combustion for the two combustion modes and the two or three combustion stages are preset datums. The temperature of the air for combustion can be measured before it enters the combustor, hence the limiting equivalence ratio $\phi$ can be determined directly from the curve of temperature rise versus equivalence ratio.

As $\phi$=stoichiometric air/fuel ratio÷actual air/fuel ratio and the stoichiometric ratio is a constant for a given fuel composition, the limiting air/fuel ratio of interest for the particular stage or mode can be determined. Consequently, with knowledge of the air flow into the combustion stage, the maximum fuel flow permitted without exceeding the limiting temperature of combustion can be determined.

Another factor which must be taken into account is the moisture content of the air passed to the combustor, because increasing water content reduces combustion temperature for a given air/fuel ratio. This increases emissions of both CO and NOx and moves the primary lean burn combustion stage nearer its weak air/fuel mixture combustion extinction limit. Humidity is therefore taken as an input factor to the calculation of the equivalence ratio relationships for combustion temperature rise.

In order to control air/fuel ratios, accurate knowledge of air flow to each stage is essential. The proportion of total combustion air passing through each stage is set by the geometry of the combustor itself, so the only direct air flow measurement required is the total airflow to the combustor.

The combustion system of a gas turbine engine discharges into the high pressure turbine nozzle guide vanes, whose capacity is known and independent of any compressor bleeds. Therefore from the knowledge of nozzle capacity combined with the fuel flow demand to the combustor, the air flow to the combustor can be determined. The critical relationship is nozzle capacity=W√T/AP=constant, where W is the flow through the nozzle (air+fuel)

T is the nozzle vane temperature

P is the nozzle throat pressure

A is the nozzle throat area

Through measurement and calculation, temperature, pressure, area and fuel flow are determined. Hence the proportion of air flow through the nozzle can be derived, and from this information and the knowledge of combustor geometry, the air flow into each stage can be evaluated at any power condition.

If we now assume a three stage combustor, operating in lean burn combustion mode, then with the tertiary stage active, the secondary stage can be modulated between temperature limits to produce tertiary combustion temperatures within a band of 1600°–1800° K., thus again minimising CO and UHC emissions whilst preventing production of NOx.

To ensure that the tertiary combustion temperature is not too low when only a small increase in fuel demand activates the stage, the secondary combustion temperature limit can be modulated towards its upper limit of 1800° K. to raise the tertiary combustion temperature and thereby avoid CO emissions.

The control system automatically accommodates power reduction by smoothly transferring combustion between stages. If the fuel flow demand of the tertiary stage is too low for the tertiary stage to satisfactorily complete combustion of the reactants without CO or UHC increasing, the flow is transferred back to the secondary stage by selecting a secondary combustion temperature limit that ensures no flow is scheduled to the tertiary stage. Assuming that the tertiary stage can be designed to achieve lean burn combustion with satisfactorily low emissions over the entire range of stable combustion conditions, flow transfer from the tertiary to the primary stage can be achieved by comparing the current fuel demand of the tertiary stage with a datum minimum fuel demand, this datum being the minimum fuel demand allowable for stable combustion in the tertiary stage. Alternatively, if such a design of the tertiary stage is not possible, then the combustion temperature rise in the tertiary stage for the stage's current fuel demand can be predicted from an appropriate equivalence curve. Transfer of the tertiary fuel demand to the secondary stage then occurs if the temperature rise in the tertiary stage is insufficient to obviate excessive CO and UHC production, i.e. if the temperature of combustion in the tertiary stage is predicted to be less than about 1600° K.

Exemplary embodiments of the invention will now be described with reference to the accompanying drawings, in which:

FIG. 1 diagrammatically illustrates the major mechanical modules or sections of a gas turbine engine with low emissions capability;

Figure 5:
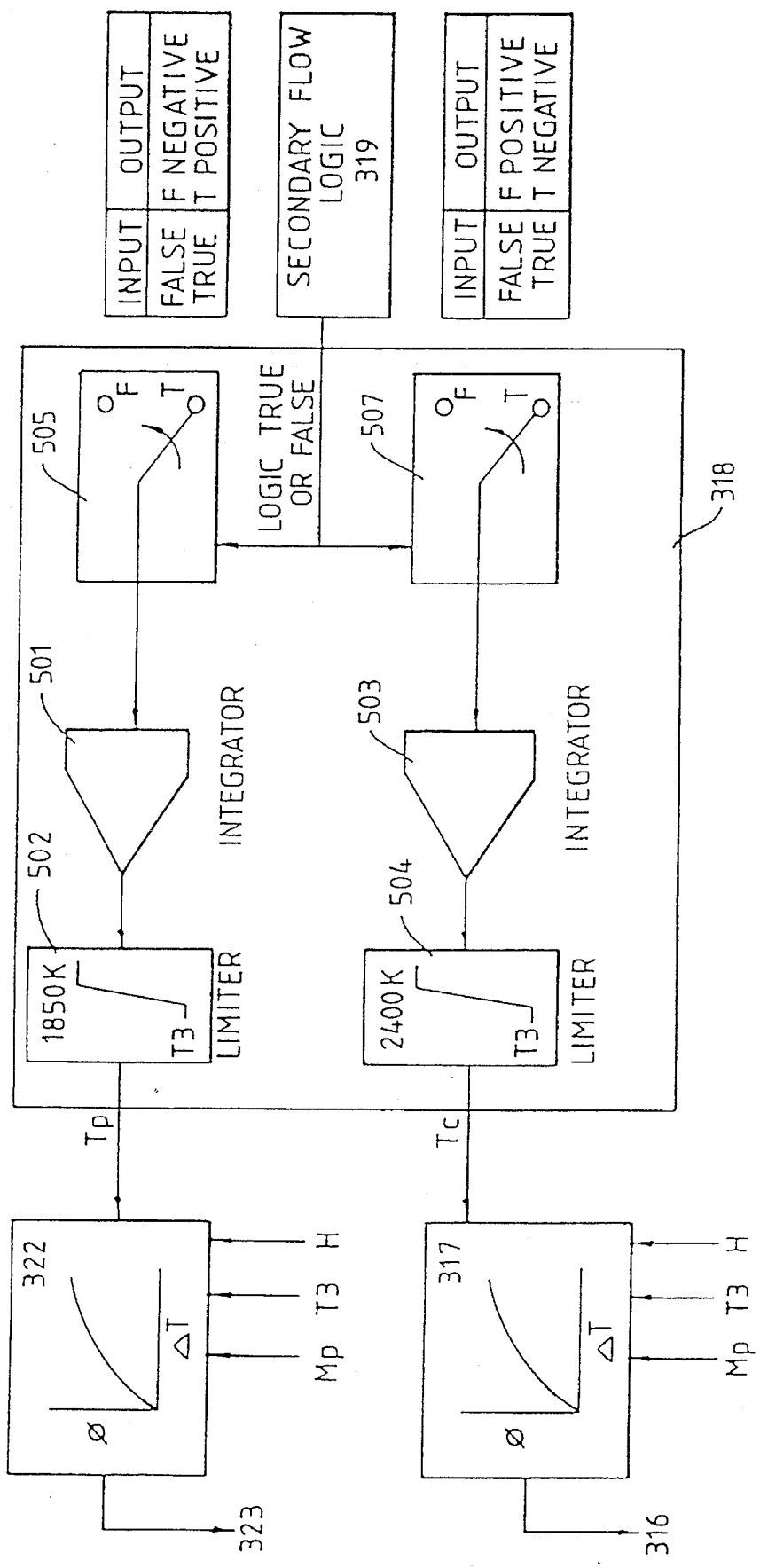
Figure 6:
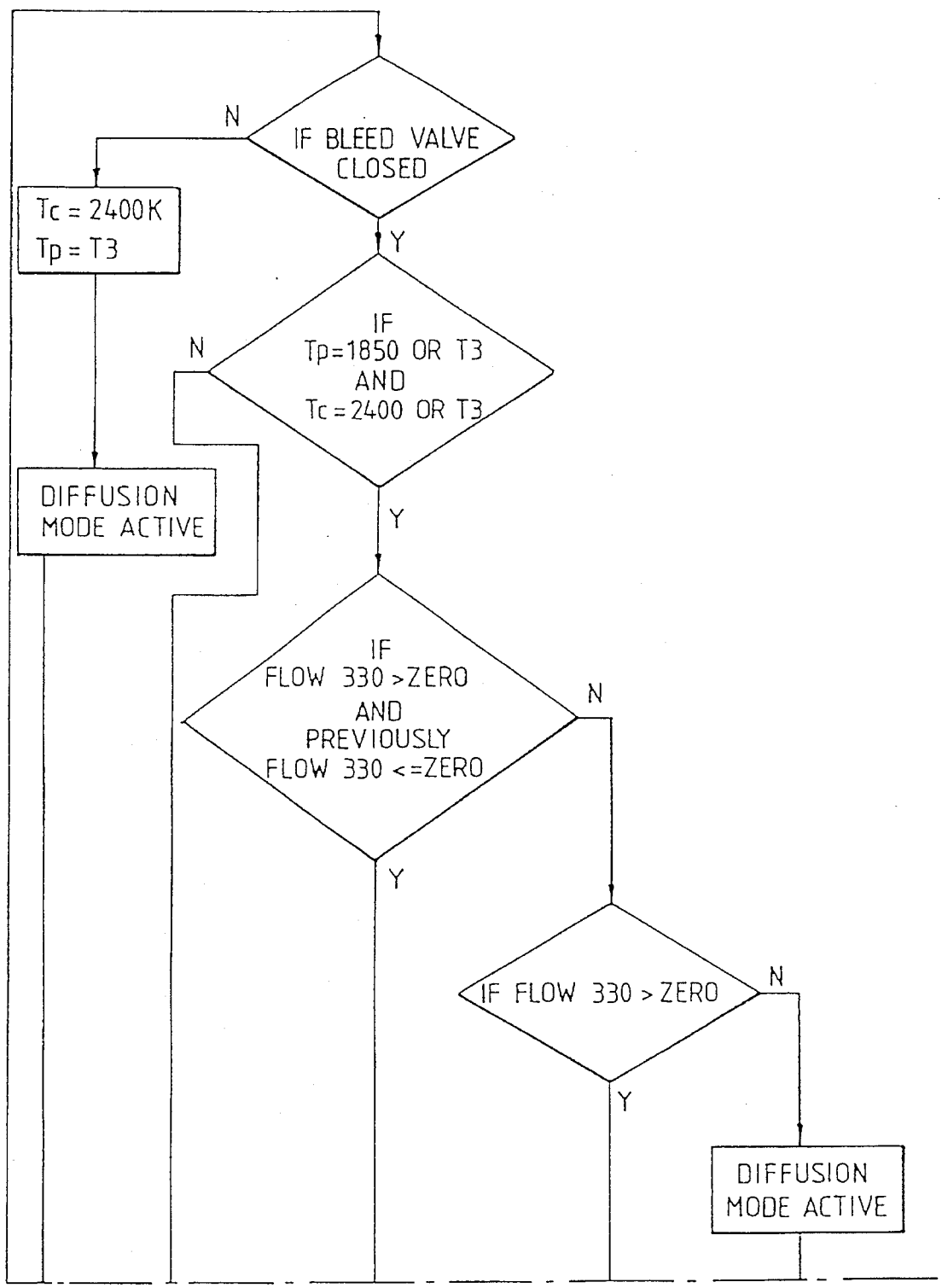
Figure 6:
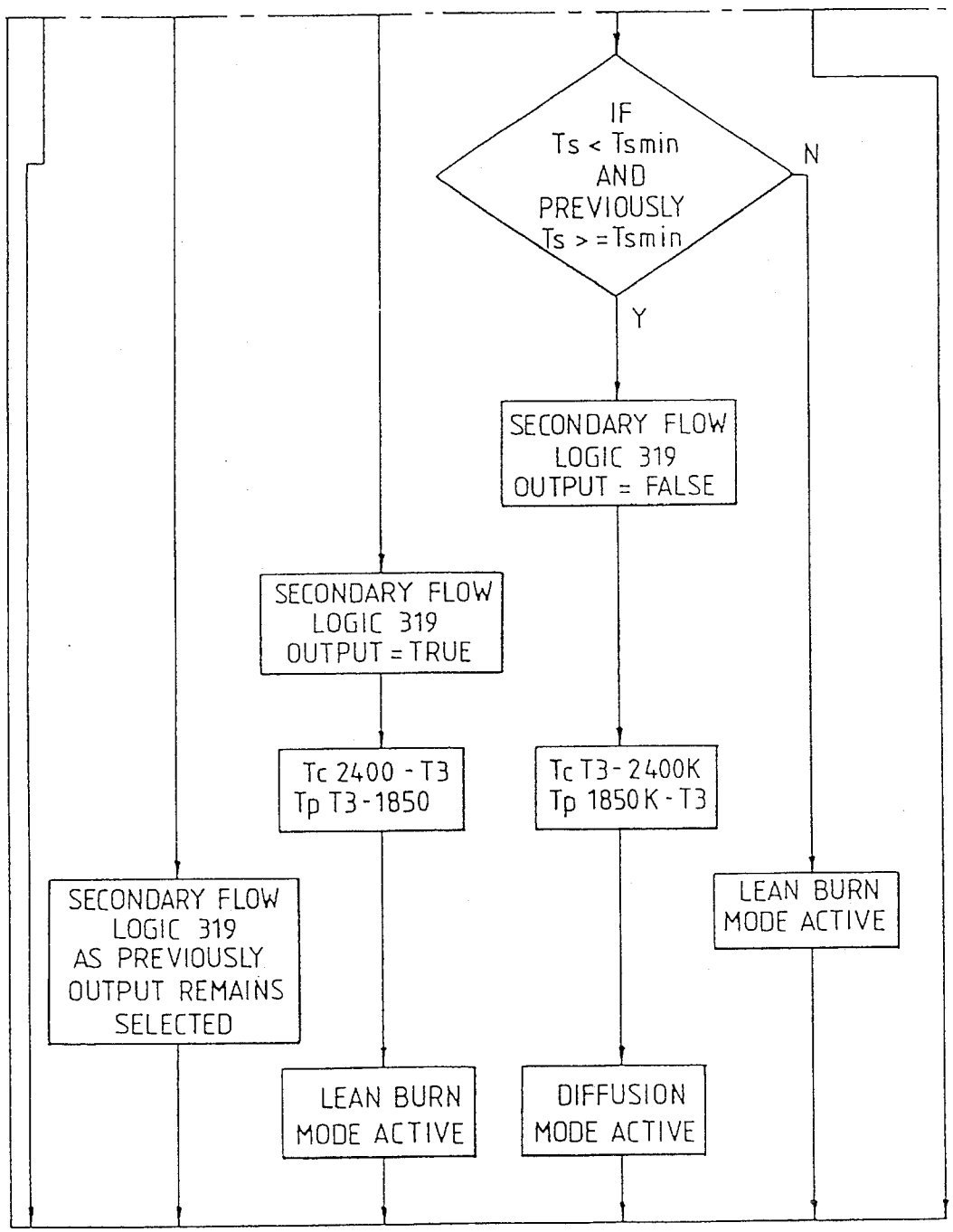
Figure 8:
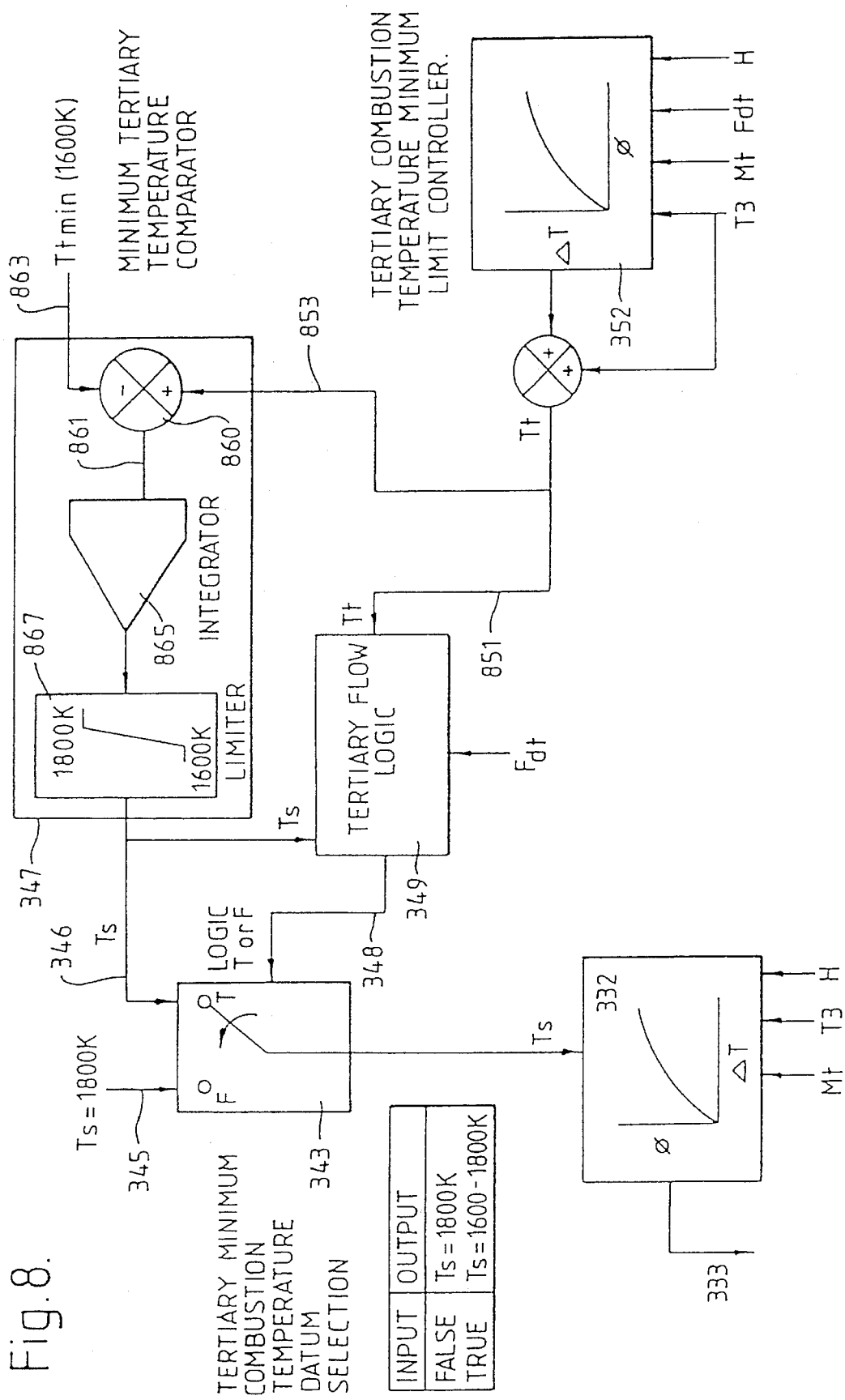
Figure 9:
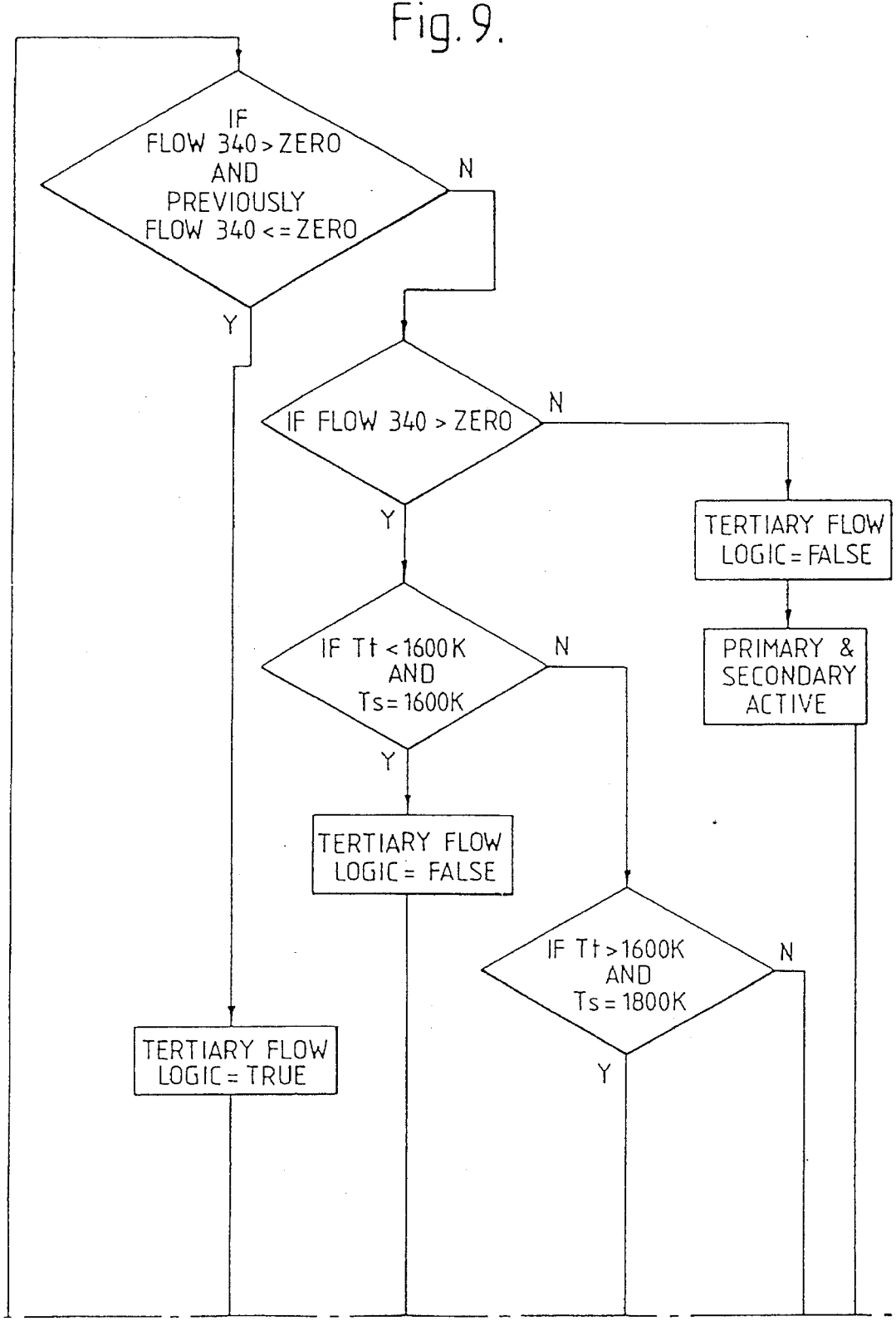
Figure 9:
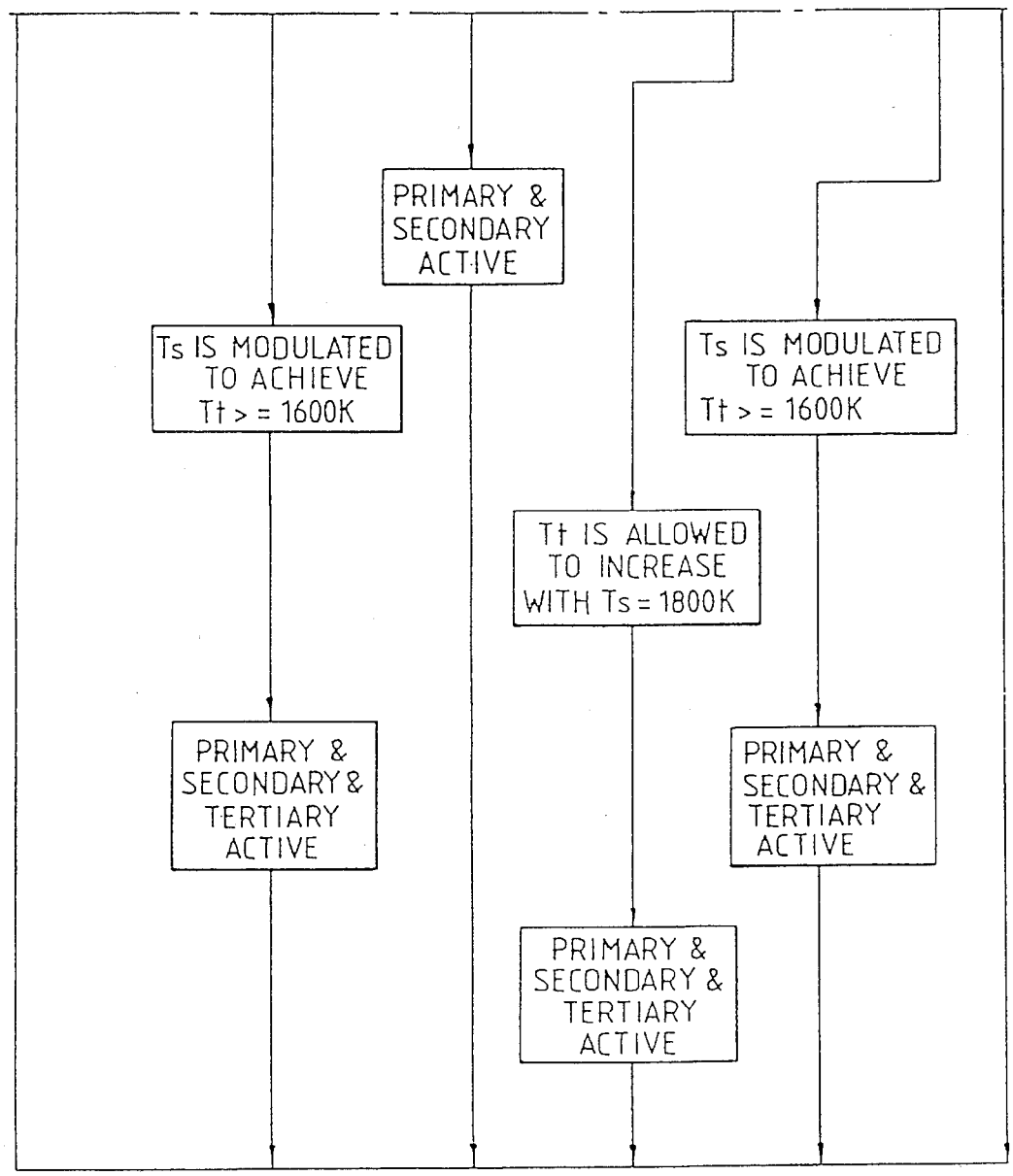

FIGS. 5, 6, 6(cont.), 7, and 7(cont.) illustrate in more detail the logic required for control of a two stage combustor; and FIGS. 8, 9, and 9(cont.) illustrate in more detail the logic required for control of a three stage combustor.

Figure 10:
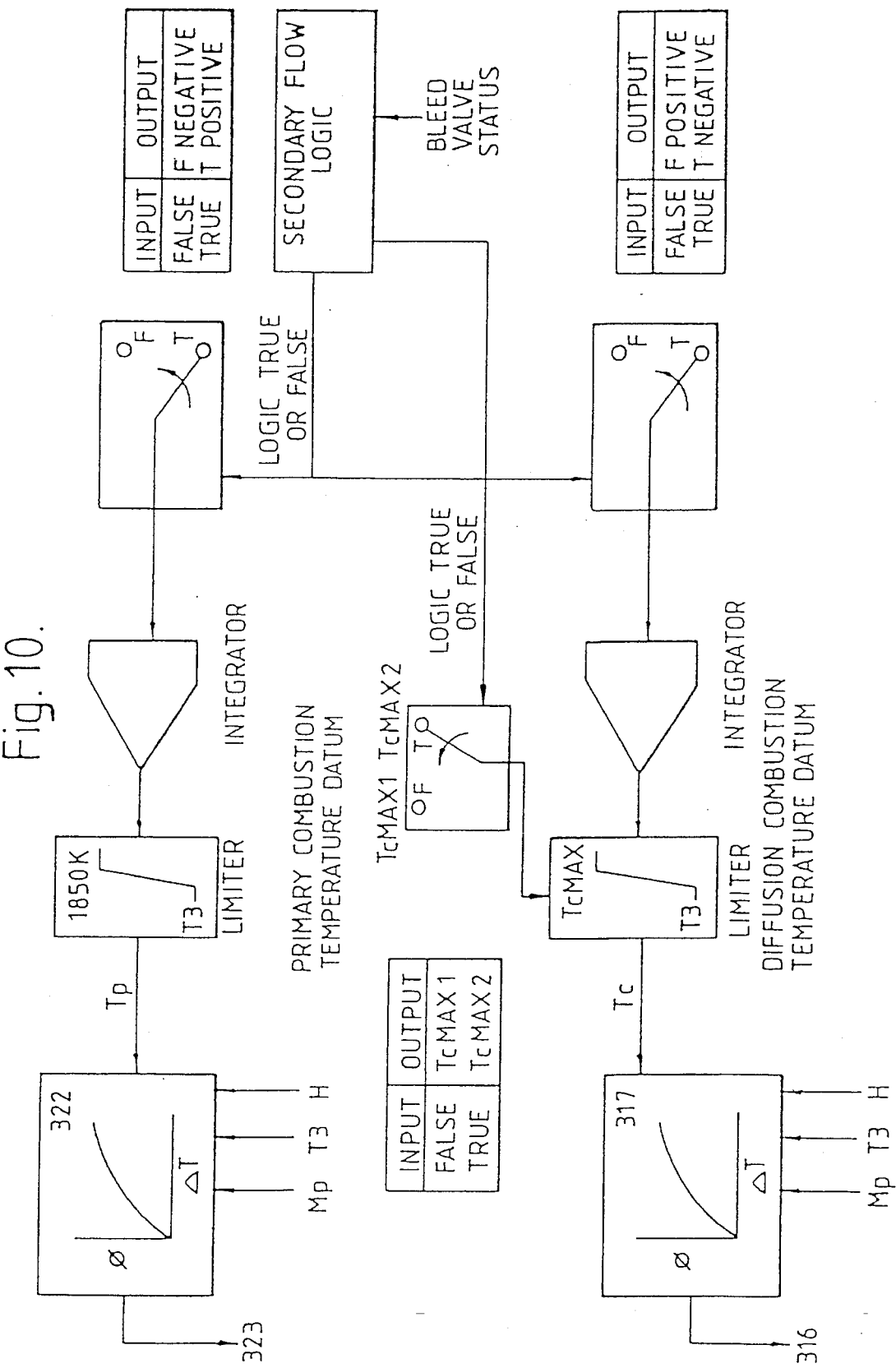
Figure 11:
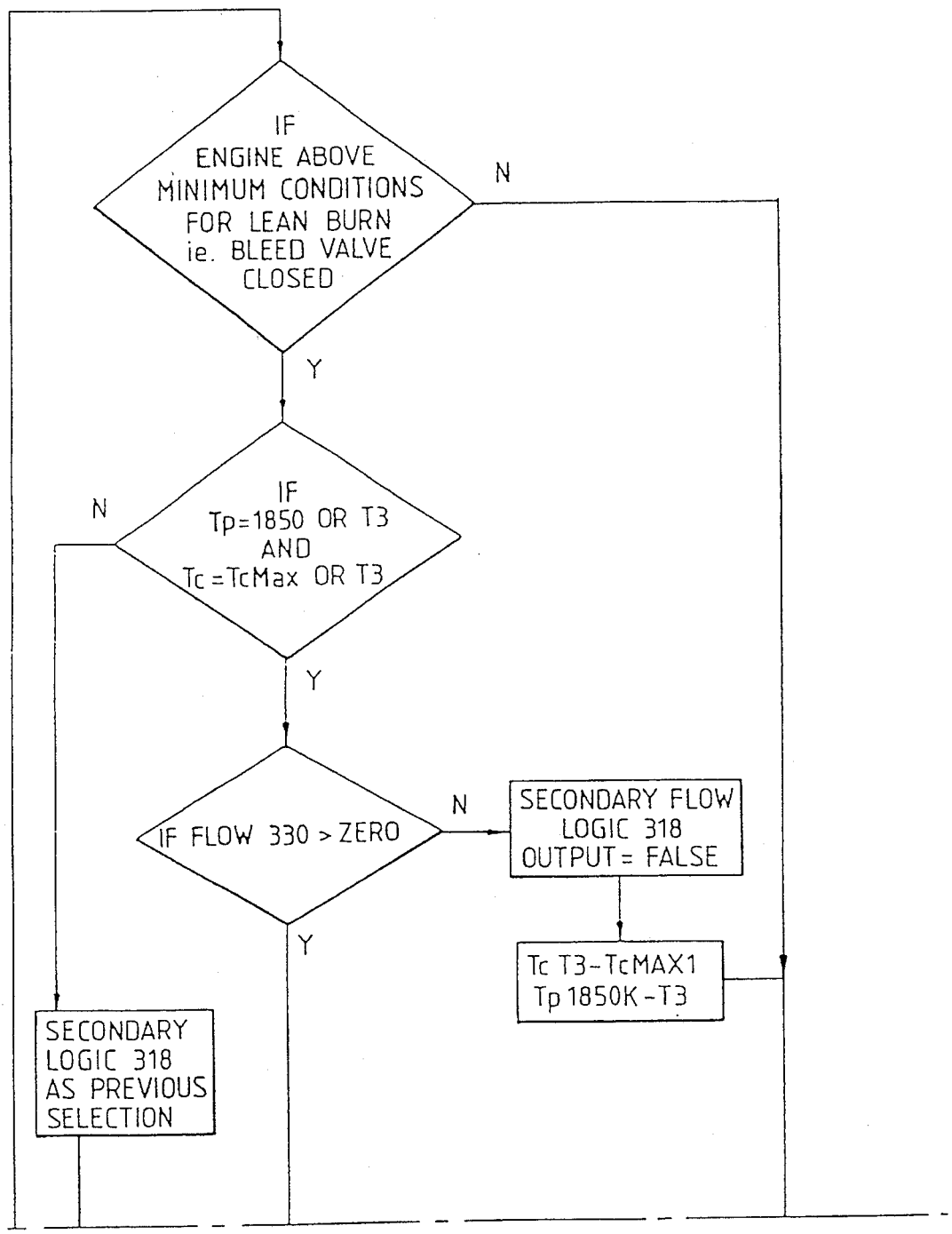
Figure 11:
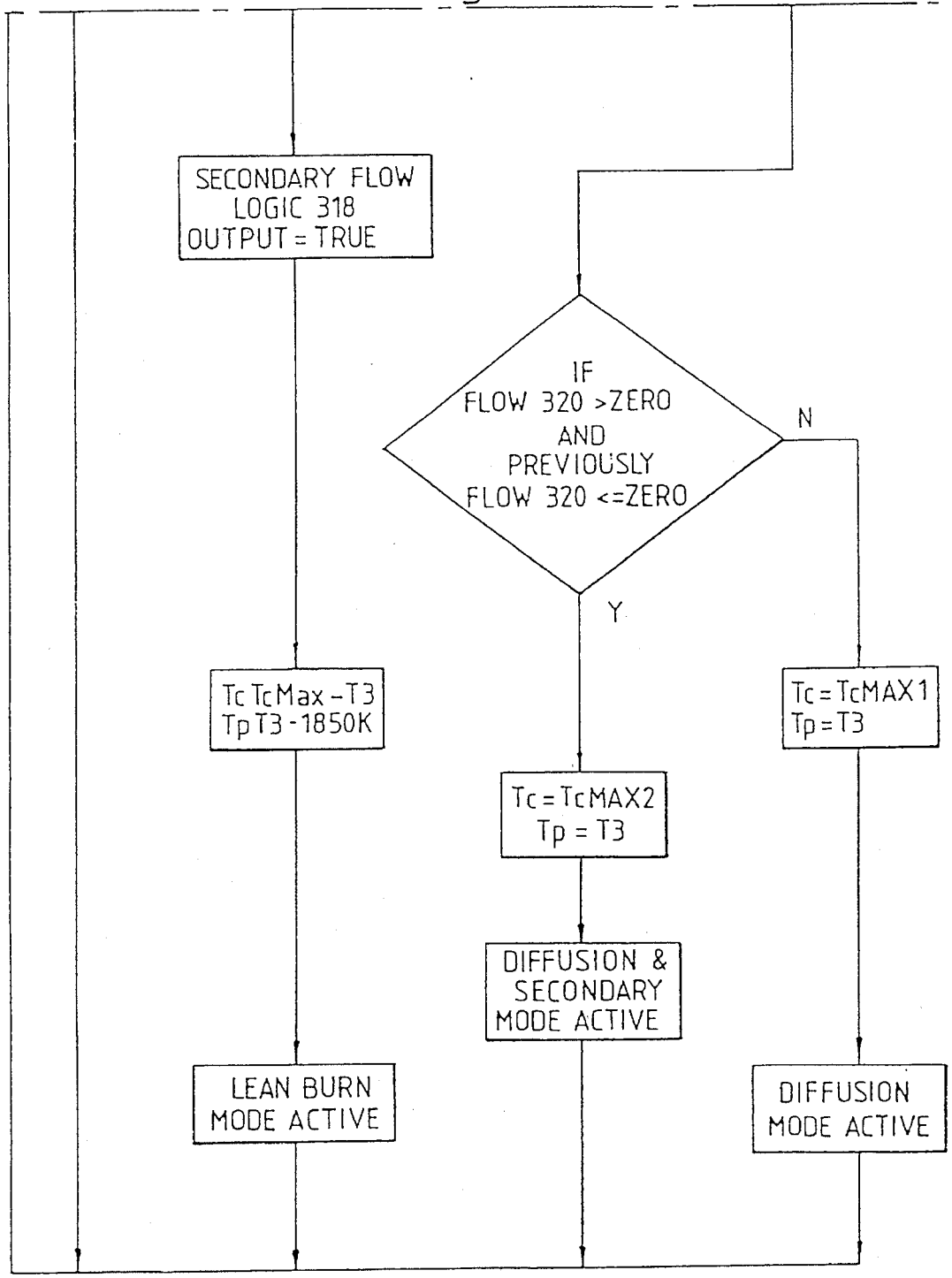

FIGS. 10, 11, and 11(cont.) illustrate in more detail the logic required for control of an alternative combustion fueling strategy.

Figure 1:
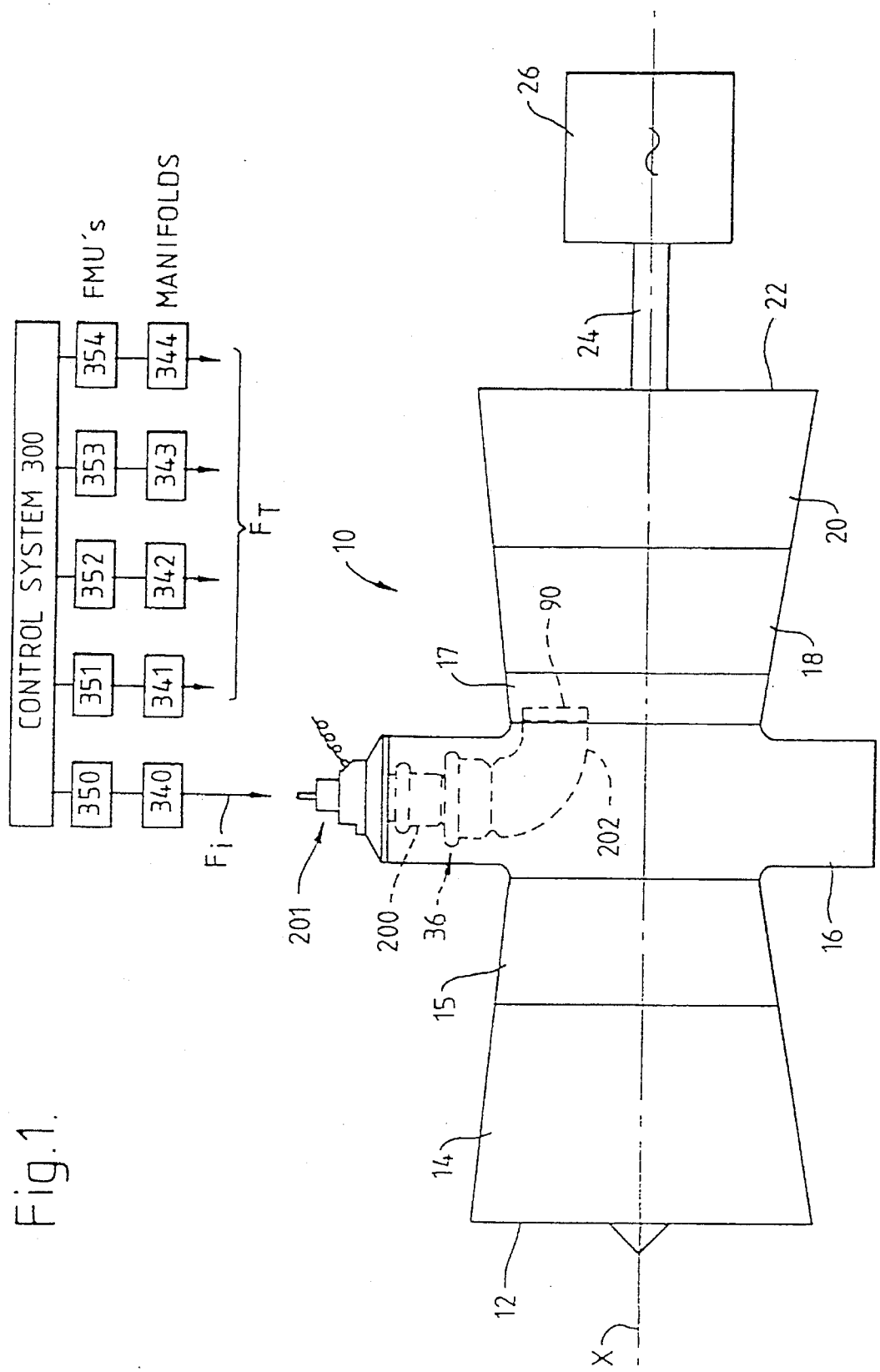

Looking at FIG. 1, an industrial gas turbine engine 10 comprises in axial flow series an air inlet 12, a low pressure (LP) compressor section 14, a high pressure (HP) compressor section 15, a combustor section 16, an HP turbine section 17, an LP turbine section 18, a power turbine section 20, and an exhaust gas outlet 22. The HP and LP turbine sections 17,18 drive the corresponding compressor sections 15,14 through concentric shafts (not shown) within the engine, each assembly of a turbine and a compressor joined together by a shaft being called a "spool". The power turbine section 20 drives a load 26 by means of a shaft 24. In this instance load 26 is indicated as an electrical generator, but could alternatively be, for instance, a pumping set for an oil, water, or gas pipeline.

In order to avoid surging of the compressor under certain engine load conditions, the compressor sections 14 and/or 15 may be provided with bleed valves (not shown) for venting excess air.

In the combustor 16 there are disposed, say, nine separate combustion chambers 36, the arrangement of only one of these being indicated by the dashed lines. Their heads 200 project radially outwards of the rest of the engine. The combustion chambers 36 are equiangularly spaced around the longitudinal axis X of the engine. All the combustion chambers are ignited and maintain their combustion independently of each other, and each therefore requires its own fuel igniter unit 201.

The discharge ends 202 of the combustion chambers 36 are turned from the radial to the downstream axial direction so that the combustion gases are discharged directly into the HP turbine 17, past nozzle guide vanes 90 to which they are secured.

The fuel is supplied to the combustor 16 through five different sets of injectors and burns in three modes.

The igniter units 201 have fuel injectors (not shown in this figure) which receive fuel $F_i$ from a fuel manifold shown diagrammatically as box 340. The combustion chamber heads 200 receive a total amount of fuel $F_T$ as separate fuel supplies to four other sets of fuel injectors (not shown in this figure) from four corresponding fuel manifolds, indicated diagrammatically by boxes 341–344. Fuel supplies to the fuel manifolds are controlled by corresponding fuel metering units 350–354, which in turn are controlled by a fuel control system 300, shown in more detail in FIG. 3. Each combustor head 200 of course also receives high pressure air from the outlet of the HP compressor section 15 for mixing with the fuel within the combustion chamber.

Figure 2:
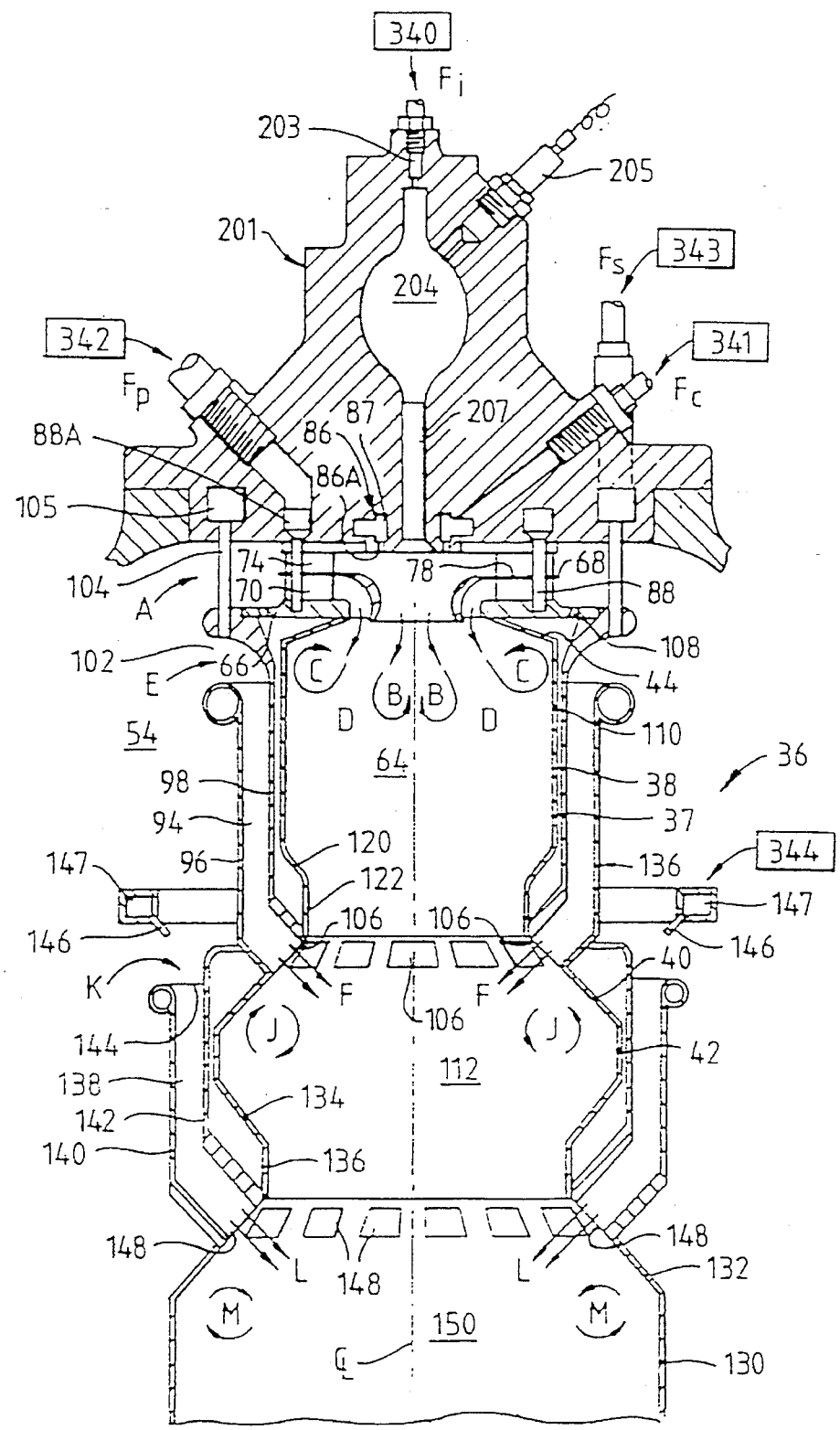
FIG. 2 shows a combustion chamber head for the engine of FIG. 1, the combustion chamber being designed to support successive stages of combustion to achieve low levels of pollutant emissions.

Turning now to FIG. 2, the operation of one of the combustion chambers 36 will be briefly described with particular reference to the five sets of fuel injectors and three combustion modes mentioned above. If a more complete description of this type of combustion chamber and its operation is required, with the exception of the ignition arrangements, our International patent publication WO92/07221 should be consulted.

Ignition Mode

Initial ignition of each combustion chamber 36 is achieved by ignition unit 201 from a small flow of gas fuel $F_i$ supplied from manifold 340 and injected through a torch injector 203 into a small ignition chamber 204 radially adjacent to the combustion chamber. The ignition chamber 204 receives an air bleed (not shown) from the head of the combustion chamber 36. The resulting fuel and air mixture is ignited from a high energy or high tension electrical ignition source 205. This results in the propagation of a flame down the connecting tube 207 into the top of the main combustion chamber 36, where it ignites the fuel emitted from the central injector 86.

The torch injector is only enabled during start up of the engine, and is disabled thereafter.

Primary Diffusion Mode

Central injector 86 comprises an annular fuel gallery 87 surrounding the connecting tube 207, with a circular array of holes 86A which inject Jets of gas from the gallery into the top of the combustion chamber. Gallery 87 is fed from manifold 341 with a flow of gas $F_c$. The gas is added to primary air A, some of which flows directly past injector 86 after it has been preswirled by passing through a tier of swirl vanes 74. Consequently, there is created a locally fuel rich mixture in a vortex B surrounding the centreline CL of the combustion chamber, where diffusion causes mixing of the primary air and the fuel. This sustains combustion in the primary zone 64. A separate annular vortex C, formed by the rest of the primary air A after it has been preswirled by flowing past another tier of vanes 70, remains an air only region. A shear layer D forms between the two vortices.

The above described diffusion flame combustion mode enables stable combustion at low fuel flows and low compressor delivery temperatures, but it results in locally high flame temperatures, and hence relatively high NOx emissions. Therefore, its use is limited to starting and where engine load and ambient conditions are outside the lean burn operating range.

As the power required from the engine increases, all the fuel flow through the central injector 86 is transferred to the main lean burn primary and secondary injectors, which are described below. The changeover point can be determined as described later.

Low Emission Mode

The aim in this mode is to keep the combustion temperatures within a range which is sufficiently narrow to avoid excessive production of both NOx and CO due to dissociation reactions, while at the same time ensuring that the residence time of the fuel and air and the intermediate combustion products in the combustion zone(s) is long enough to achieve substantially complete combustion, so avoiding large emissions of CO and UHC's.

To this end, the main primary, secondary, and if needed, tertiary combustion stages adopt the principle of premixing the fuel and air at ratios weaker than stoichiometric prior to their entry to the combustor to enable a lean burn type of combustion. However, secondary and any subsequent stage of combustion takes place with an input from the products of combustion from the preceding stage.

Main Primary. A circular array of main primary injectors 88 are connected to an annular fuel supply gallery 88A, which receives fuel $F_p$ from manifold 342. The injectors 88 inject gas fuel into the lower and upper sets of passages formed by the two tiers of preswirl vanes 70,74, respectively, which are separated by an annular wall 78. This ensures that the fuel and air are partially premixed in ratios weaker than stoichiometric before the reactants enter the primary combustion zone 64. Because the two sets of preswirl vanes 70,74 are oriented to impart opposite senses of rotation to the air flowing between them, burning in the primary zone 64 takes place in two separate vortices B and C of opposite hand, separated by a shear layer D, giving improved mixing turbulence. This thorough mixing enables combustion temperatures to be controlled to approximately 1850° K., low enough to prevent significant dissociation of nitrogen in the combustion process, thereby preventing formation of much NOx. Additional secondary and optionally tertiary combustion stages are required so that combustion can proceed to completion in a sufficiently controlled manner at all important operating conditions.

Secondary. Secondary combustion takes place in the secondary combustion zone 112 of the combustion chamber 36. Again, a lean burn type of combustion is achieved, this time by utilising a circular array of injectors 104 connected to an annular fuel gallery 105 to inject fuel gas into the opening 102 of an annular duct 94 which surrounds the primary combustion zone 64. The secondary fuel flow $F_s$ is supplied from a manifold 343. Fuel so injected premixes with the secondary air E from the exit as it enters the duct 94. The mixture enters the secondary combustion zone 112 as a circular array of discrete Jets F directed towards the centre of the zone from apertures 106. There, further combustion takes place with the products of combustion from the primary zone 64. Note that to achieve more thorough mixing, the secondary zone 112 is shaped so as to encourage the development of vortices J which recirculate some of the fuel/air mixture and partial products of combustion into the mixing zone where the jets F penetrate the primary combustion products. In this stage the temperature of combustion is controlled within upper and lower limits, nominally 1800°–1600° K. to ensure that no further NOx will form, while minimising CO.

Tertiary. When tertiary combustion is required, a similar lean burn process is initiated in tertiary combustion zone 150 by injecting further gas fuel from injectors 146 into tertiary air K entering the opening 144 of an annular duct 94 which surrounds the secondary combustion zone 112. The injectors are supplied with fuel from the manifold 344 through a gallery 147. The tertiary combustion process will not be further described because it is so similar to the secondary process described above, as can be seen from FIG. 2. Combustion temperature range is also similar.

Combustion Temperatures in Low Emission Mode

The careful mixing in the lean burn primary zone 64 is designed to produce a constant combustion temperature of about 1850° K. The temperature in the secondary zone is not allowed to exceed 1800° K. and for the most part the careful control of the mixing process of primary combustion products with the secondary premixed reactants produces combustion temperatures within the range 1600° K. to 1800° K. However, if the tertiary combustion stage is also active, the temperature in the secondary zone is modulated within the said range and the temperature in the tertiary zone is controlled within the range 1600° K. to 1800° K.

Control System

Figure 3:
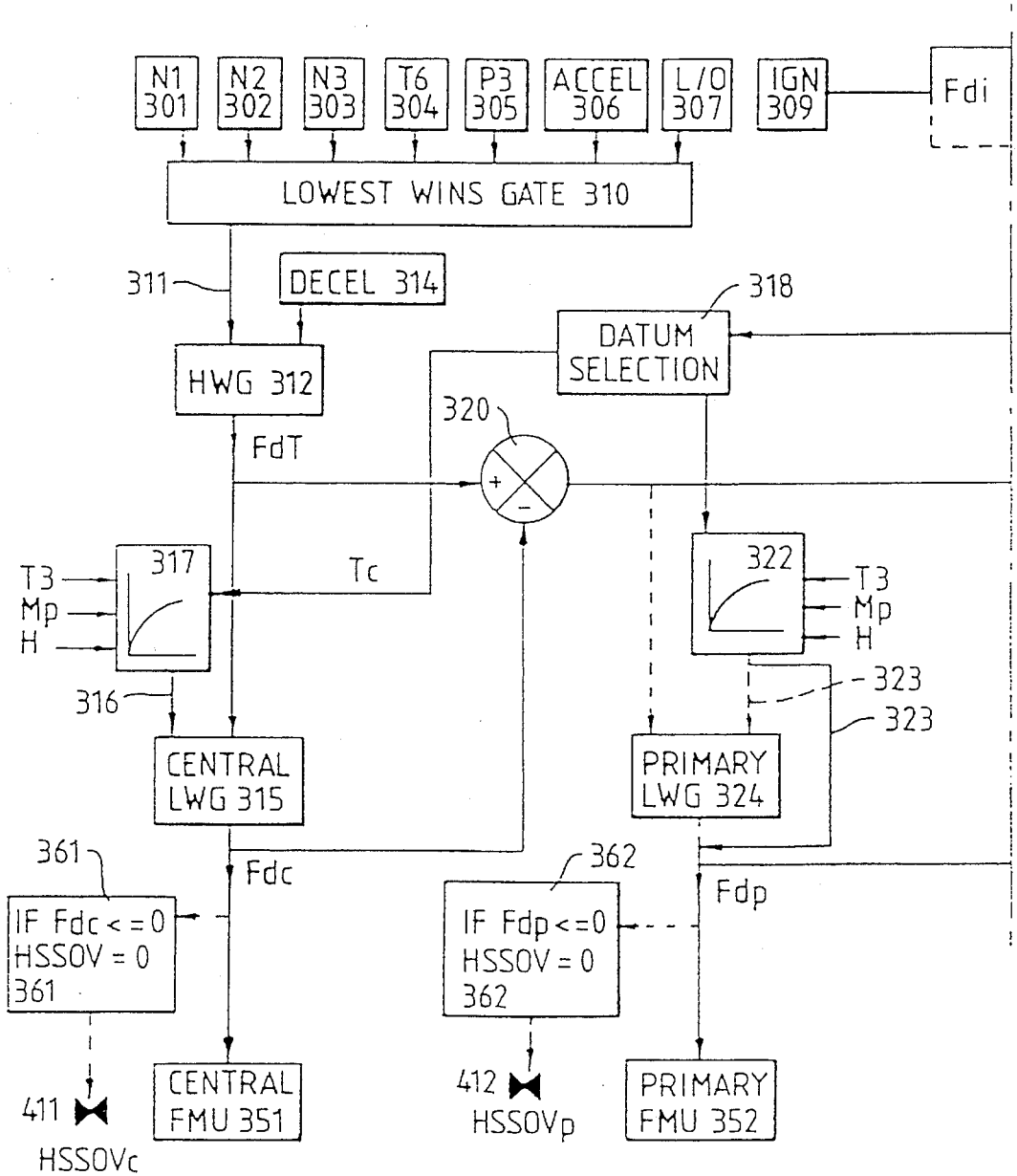
FIG. 3 and FIG. 3(cont.) are diagrammatic representation of a fuel control system in accordance with the invention for setting fuel flow to the stages of the combustion chamber shown in FIG. 2.
Figure 3:
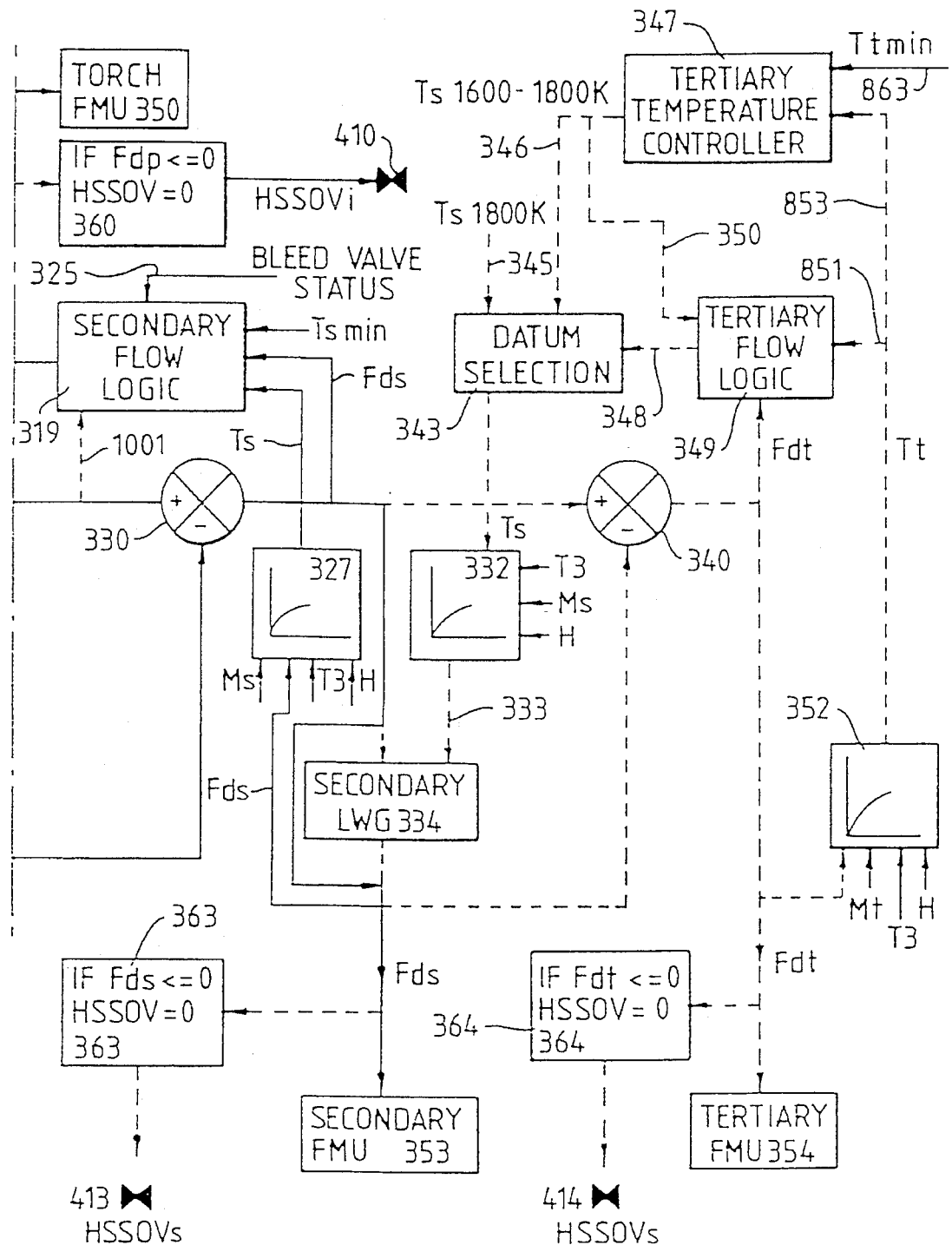

Looking now at FIG. 3, the control scheme there illustrated relates firstly to the control needed for a combustor possessing only the first two stages of the three stage combustor shown in FIGS. 1 and 2. However, the extra control elements needed for a three stage combustor are also indicated, these being connected up with the earlier parts of the system by dashed lines to the right of control element 320 in FIG. 3.

Basically, FIG. 3 embodies a method of scheduling fuel flow which, briefly described, comprises putting a plurality of engine fuel flow governors 301–307 in parallel with each other and letting the governor which outputs the lowest fuel demand signal be the one which schedules the total fuel flow $F_{dT}$ to the engine. Fuel flows $F_{dc}$, $F_{dp}$, $F_{ds}$ and $F_{dt}$ to the central, primary, secondary and tertiary stages, respectively, are then individually scheduled to achieve the lowest fuel flows consistent with defined temperature limits for the corresponding modes and stages of combustion.

A detailed description of the control system now follows, starting at the top left corner of the diagram. It should be understood that the various signal processing components of the diagram are preferably implemented as software modules in a digital electronic control system, though discrete electronic components could be used to achieve the same control less reliably and economically.

Firstly, seven controllers 301–307 give respective fuel demand output signals in parallel to a lowest wins gate 310, which outputs only the fuel demand signal 311 demanding the lowest fuel flow. The inputs to the controllers 301–307 are control room console settings and sensors in the engine.

Closed loop controllers 301,302 and 303 give fuel demand outputs f(N1), f(N2) and f(N3) which are functions respectively of the scheduled rotational speeds of the low pressure spool of the engine, the high pressure spool and the power turbine 20. The schedules of the rotational speeds have of course been previously calculated, as known in the industry, by reference to control laws relating the control room console settings to the behaviour of the engine.

Closed loop controller 304 gives a fuel demand output f(T6), which is a function of the exhaust gas temperature as measured by a sensor at the entry to the power turbine.

Closed loop controller 305 gives a fuel demand output f(P3) which is a function of HP compressor delivery pressure.

Open loop controller 306 limits instantaneous increases in fuel demand to avoid surging the engine. It does this by monitoring the pressure P3 mentioned above and using the monitored pressure values to derive a fuel demand value from a look up table.

Open loop combustion start controller 307 gives a predetermined fuel demand output signal $F_{dc}$ for the purpose of setting an initial value of fuel flow $F_c$ to the central injector 86(FIG. 2), which is then ignited by the flame from the torch injector 203. In connection with this, another open loop controller 309 gives a predetermined fuel demand output signal $F_{di}$ to the torch fuel metering unit (torch FMU) 350 to set the fuel flow $F_i$ to the torch injector. After detecting successful ignition and an increase in engine speed beyond a predetermined limit, the controller 309 shuts off the fuel flow $F_i$ to the torch injector and triggers controller 307 to schedule an increase in fuel demand signal 308 through the lowest wins gate 310 to the appropriate FMU 351. This schedule takes the form of a predetermined rate of increase of fuel flow, which continues until controller 301 takes over at the point when N1 reaches the minimum value for self sustaining operation of the engine. Thereafter, signal 308 is set to a high value so that it no longer passes through the lowest wins gate 310.

Controller 301 selects a fuel demand f(N1) which maintains the engine at the self sustaining speed for a period which is sufficiently long to allow the compressor and turbine sections of the engine to attain stable operating temperatures. When that period is over, the control room console settings' input to controller 301 is increased at a predetermined rate so that fuel demand f(N1) is proportionally increased until the power developed is such that the power turbine speed N3 reaches the initial control room console settings of its controller 303. After this, different loadings are accomplished by modulating the control room console settings.

Closed loop controllers 302,304,305 are provided to limit the top values of their respective engine parameters during operation of the engine at high powers.

The lowest wins gate 310 ensures that the lowest fuel demand signal 311 is output to a highest wins gate 312. Here, the fuel demand signal 311 is voted with the output of an open loop deceleration controller 314 which is set as a function of the speed N1 of the low pressure spool by a look up table. Controller 314 limits the instantaneous decrease in fuel demand in order to prevent flame-out of the combustion chambers in the event that the instantaneous decrease of the fuel demand signal 311 becomes too great.

The fuel demand output $F_{dT}$ from the highest wins gate 312 is a total fuel flow signal which must be appropriately divided among the fuel metering units 351,352,353, and when required, 354, which control the fuel flows to the fuel manifolds of the central (primary diffusion), main (lean burn) primary, secondary and tertiary injectors, respectively.

Figure 4:
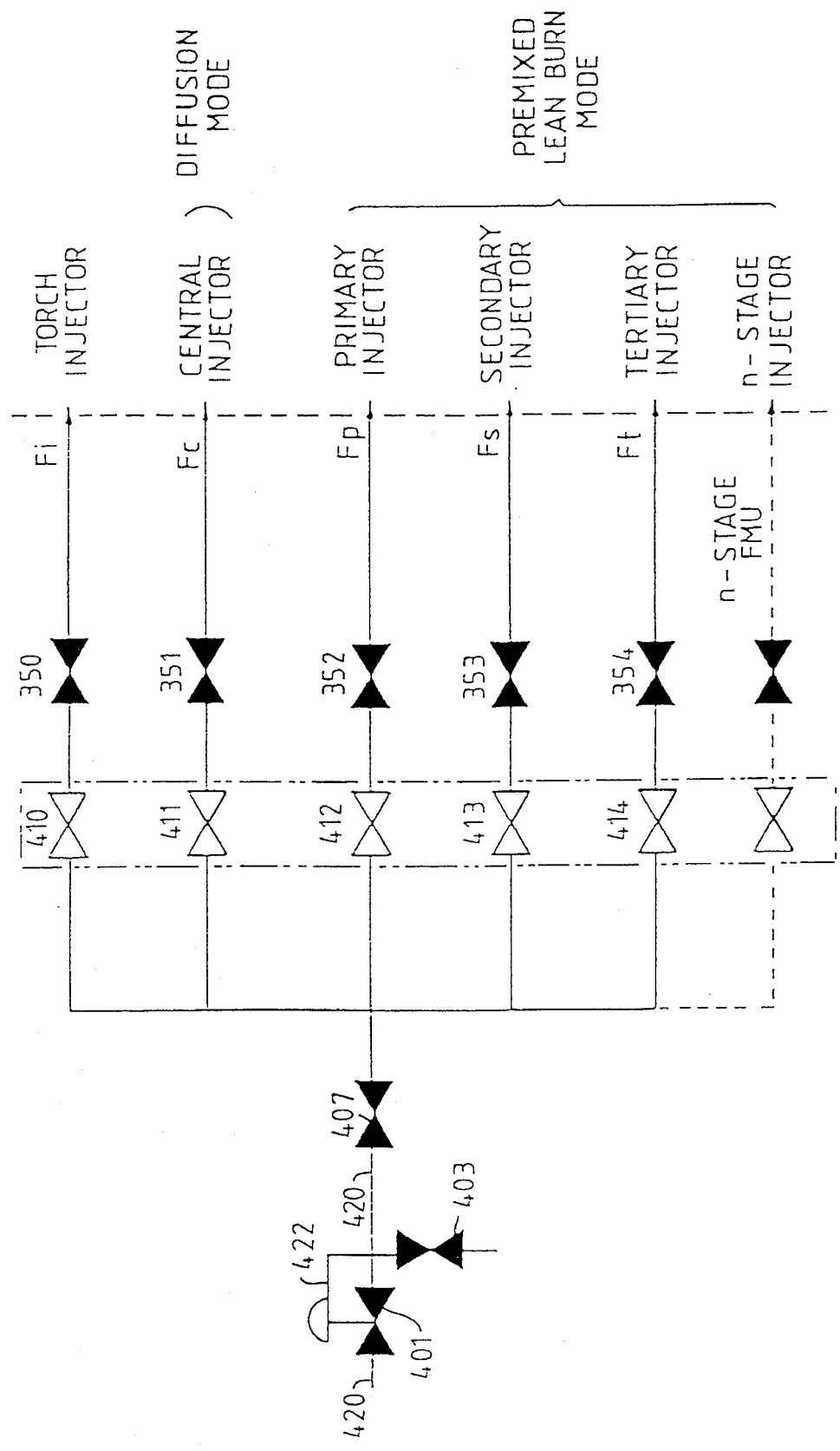
FIG. 4 is a diagrammatic representation of a valve arrangement controlled by the fuel control system of FIG. 3 for controlling the flow of fuel to the stages of the combustion chamber shown in FIG. 2.

With reference also to FIG. 4, it should be noted that the fuel demand signal to each FMU 350–354 is also shown as being passed to a corresponding shut off valve control unit 360–364 which senses when each fuel demand signal drops to zero or below and automatically signals an associated high speed shut off valve 410–414 to stop the flow to the corresponding fuel metering unit. The units 360–364 and the valves 410–414 are only required if the fuel metering units 350–354 do not incorporate valves which seal sufficiently tightly to obviate any unwanted leakage of fuel through them when their fuel demand signals are zero. Pressurised gaseous fuel enters the main fuel feed line 420, to which the individual fuel feeds to the various fuel injectors are connected. A main shut off valve 407 terminates all fuel flow to the engine in the event of total engine shut down. A regulator valve 401, with a pressure feedback 422 from the main fuel feed line 420, enables a constant fuel supply pressure to be maintained. A vent valve 403 enables fuel to be drained from the system for maintenance purposes.

Fuel Control from Startup to Full Power

Diffusion flame combustion mode. Returning to a consideration of FIG. 3, the process of achieving appropriate division of the total fuel demand output signal $F_{dT}$ from highest wins gate 312 is begun by inputting to a further lowest wins gate 315, where it is voted against the fuel demand output 316 of a primary diffusion flame combustion temperature controller 317 for the primary diffusion flame combustion mode. Output 316 is the fuel demand output signal necessary to achieve a primary diffusion combustion temperature rise of $(T_c - T3)°K$. $T_c$ is the combustion temperature limit datum for the primary diffusion flame combustion mode, which is set by a primary combustion temperature datum selector 318 at either 2400° K. or T3, as described later. T3 is about 650°–750° K., the current temperature of the air at the inlet to the combustor. The inputs to controller 317 are T3, an ambient atmosphere humidity signal H, the air mass flow rate $M_p$ through primary combustion zone 64 when the central injector 86 is being used, and $T_c$. These four inputs are used by controller 317 to derive the output 316 from standard thermodynamic relationships which relate fuel mass flow rates to temperature rise during combustion, to actual and stoichiometric fuel/air ratios and to $M_p$. Alternatively, or in addition to the method based on thermodynamic theory, results of tests of the engine could be used to produce matrices which are incorporated in the controller 317 and relate the inputs to the desired output signal 316.

Only when signal $F_{dT}$ becomes greater than signal 316 does the lowest wins gate 315 select signal 316 to pass on as the primary diffusion flame combustion fuel demand signal $F_{dc}$ to the fuel metering unit 351.

Lean burn combustion mode. In the presently preferred embodiment, a primary lean burn combustion temperature controller 322 outputs a fuel demand signal 323 directly to FMU 352. Because controller 322 always sets the correct fuel flow for the main primary injectors 88, signal 323 is the same as fuel demand signal $F_{dp}$ at all times. However, FIG. 3 also shows, with connections in dashed lines, an alternative way of controlling lean burn combustion in the primary stage, in which the signal 323 is input to a lowest wins gate 324 in parallel with the output from the summing junction 320, the output of the lowest wins gate being $F_{dp}$.

In the preferred embodiment, the main primary combustion process never operates without the secondary combustion stage. Therefore, as mentioned above, the main primary combustion fuel demand $F_{dp}$ is always determined by the output of the controller 322. Consequently, the lowest wins gate 324 is not required for control of the fuel flow $F_p$ to injectors 88 in the preferred embodiment. Nevertheless, other fuelling strategies may be required which would necessitate the presence of a gate 324. For instance, should the particular design of combustor being used produce a sufficient degree of combustion stability for a lean burn low emission mode of operation at all times in the primary combustion stage, the lowest wins gate 324 will allow engine operation over the required range as necessary.

In the preferred embodiment, combustion temperature controller 322, in conjunction with the primary combustion temperature datum selector 318, is responsible for scheduling fuel flow $F_p$ to the main primary injectors 88 for lean burn combustion in the primary zone 64. In this combustion mode, the controller 322 modulates the fuel flow to produce an air/fuel ratio which maintains a combustion temperature of approximately 1850° K., thus preventing significant formation of NOx. As was the case for controller 317, there are four inputs to the controller 322, namely combustor inlet temperature T3, humidity H, the air mass flow $M_p$ to the combustor primary zone and the limiting temperature $T_p$ set by temperature datum selector 318. These are used to determine the limiting fuel/air ratio and hence the fuel flow scheduled to the main primary injectors 88.

Concurrent Use of Diffusion Flame and Lean Burn Combustion Modes

In a series staged combustor such as disclosed in WO 92/07221, the gases entering the secondary and tertiary combustion stages are preheated by the previous primary and secondary combustion processes. Therefore, the weak stability margin of the lean burn combustion process in the last combustion stage (or last two combustion stages in a three stage system) is large enough to accommodate transient changes in fuel demand (i.e. variations in air/fuel ratios), and hence not interfere with the ability of the engine to meet power turbine load changes. However, the main primary combustion stage operates with a narrow stability margin because the air it receives is cooler, having a temperature T3. Hence the allowable variations in lean burn air/fuel ratios for the main primary combustion stage are limited. Consequently, if the lean burn primary combustion process were to be relied upon entirely during the period from start up of the engine through to the time when the power turbine becomes loaded, there would be a danger of combustion instability during this time.

To overcome this limitation of the lean burn main primary combustion process, we allow operation of the combustion temperature limit of $T_c=2400°$ K. This can be primary diffusion flame combustion process during this danger period, using central injectors 86, at an average achieved because the diffusion flame combustion process with the central injectors keeps the main heat of combustion away from the walls of the combustion chambers 36. Hence, the richer burning, more stable combustion process using the central injectors can be used to extend the stability of the primary combustion process from start up of the engine through to power turbine load take up. In particular, this avoids the danger of combustion instability induced by operation of bleed valves in the compressor during this initial period. Operation of the bleed valves tends to cause large fuel flow variations over short time periods, which in turn causes large air/fuel ratio variations.

Transfer between Combustion Modes

During the normal operational cycle of the engine, the control system is of course required to transfer, without power loss, between the two combustion modes of which the primary stage is capable.

The transfer between combustion modes can be achieved as follows.

During startup, temperature datum selector 318 initially sets $T_c$ for controller 317 to 2400° K., and $T_p$ for controller 322 to the current T3 temperature. This gives a zero value output 323 from controller 322. In this way, the fuel flow $F_p$ is zero as long as the output 323 of the controller 322 is zero.

When the engine has reached an operating condition where fuel demand output signal $F_{dc}$ is limiting the further acceleration of the engine, or an undesirable combustion temperature control limits $T_c$ and $T_p$ from amount of pollutants are being produced, the temperature datum selector 318 uses ramp functions to change the 2400° K. to T3 and T3 to 1850° K. respectively. The logic for initiating the temperature datum changes is explained later, but basically comprises a secondary flow logic module 319 which detects when a fuel demand signal for the secondary combustion stage is output from a further summing junction 330.

The fuel flows $F_c$ and $F_p$ through the two sets of injectors 86 and 88 are controlled by their respective FMU's 351,352, but both put fuel into the same primary combustion zone 64. As diffusion flame primary zone combustion decreases with signal $F_{dc}$, lean burn primary zone combustion increases with signal $F_{dp}$ until changeover between combustion modes is completed.

Concurrently with the changeover of combustion mode in the primary stage, the summing junction 330 is outputting the difference between the total fuel demand signal $F_{dT}$ and the instantaneous fuel demand signals $F_{dc}$ and $F_{dp}$. This becomes the fuel demand signal $F_{ds}$ which controls the FMU 353 for the fuel flow $F_s$ to the injectors 104 in the secondary stage.

Finally, when the FMU 351 is not allowing any fuel through to central injectors 86, any increase in fuel demand above that which is allowed by controller 322 is output from the summing junction 330 as a signal of the value $F_{dT}-F_{dp}$, $F_{dc}$ being zero.

Following from the above, it will be seen that in the lean burn combustion mode, increasing load on the engine will cause the combustor inlet temperature T3 to increase, along with air mass flow rates to the primary combustion stage. The fuel flow $F_p$ will correspondingly increase according to the output of the combustion temperature controller 322. Again, excess fuel flow which is not taken by the primary stage, due to the combustion temperature limitations, is passed on to the secondary stage.

Fuel Control for Reducing Power

Decreasing lead on the engine results in controller 303 reducing the fuel demand signal 311 and $F_{dT}$. Initially, this produces a reduction in signal $F_{ds}$ with corresponding reduction in fuel flow to the secondary stage.

After a short lag time, decreasing lead will cause the combustor inlet temperature T3 to decrease, along with air mass flow rates to the primary combustion stage. The fuel flow $F_p$ will accordingly decrease as commanded by the output of the combustion temperature controller 322.

In the absence of any further reduction in lead, the secondary stage will settle at a new stable value of $F_{ds}$, i.e., the difference between the new values of $F_{dT}$ and $F_{dp}$.

With further decreases in lead, the fuel flow to the secondary stage will eventually reduce until the pollution emission limits cannot be achieved. At this condition, the temperature datum selector 318 ramps down $T_p$ from 1850° K. to T3 whilst ramping up $T_c$ from T3 to 2400° K., thereby transferring the primary stage back to the diffusion flame combustion mode.

Fuel Control for Constant Load and Reducing Ambient Temperature

Assuming initial operation in lean burn combustion mode, with loading on the engine remaining constant but with a decrease in ambient temperature, the changes in combustor inlet temperature T3 and air mass flow $M_p$ will again produce an increase in the fuel demand signal 323($F_{dp}$) from primary combustion temperature controller 322. This results in a corresponding reduction in the secondary stage fuel demand signal $F_{ds}$ due to the reduction in the difference signal output from summing junction 330. Without further reductions in ambient temperature, the secondary stage will settle at a new stable fuel demand, as was the case for decreasing load. Further reductions in ambient temperature will produce the same effect as the further reductions in load referred to above, so that in the event pollution emission limits cannot be achieved, the primary stage will be transferred back to the diffusion flame combustion mode.

Fuel Control for Constant Load and Increasing Ambient Temperature

If the engine is being loaded at an ambient temperature for which the diffusion flame combustion mode is being utilised, an increase in ambient temperature while engine load remains constant will alter the inputs T3 and $M_c$ to the diffusion flame combustion temperature controller 317. Hence, the fuel demand output 316 will reduce. When the total fuel demand signal $F_{dT}$ becomes greater than signal 316, lowest wins gate 315 will output signal 316 as $F_{dc}$ to control fuel flow to the central injectors 86 and summing junction 320 will output the difference signal $F_{dT}-F_{dc}$ to the next summing junction 330 for use as the fuel demand signal for the secondary stage. This will trigger the secondary flow logic 319 and the temperature datum selector 318 in the same way as an increase in load at constant ambient temperature would do. Hence, temperature datums $T_c$ and $T_p$ will be ramped down and up respectively, as detailed previously for increasing load, thereby transferring the primary stage to lean burn combustion mode while secondary stage combustion is initiated.

Primary Combustion Temperature Datum Selector

As mentioned above, the combustion temperature datum selector 318 provides a means of selecting appropriate combustion temperature datums $T_c$ and $T_p$ for the two primary stage combustion temperature controllers 317 and 322, which control combustion in the diffusion flame and lean burn modes respectively.

Whenever the datum selector 318 receives a logic signal from the secondary flow logic 319 requiring a change of combustion mode, it initiates a controlled rate of change of temperature datums $T_c$ and $T_p$. To achieve this, the datum selector 318 consists of two identical ramp functions as schematically shown in FIG. 5. The ramp functions are represented by integrators 501, 503 and limiters 502, 504. The output of each integrator controls the respective temperature datum $T_p$ and $T_c$ by increasing or decreasing these at a preset rate, in accordance with the sign of the input signal from a respective logic switch 505, 507. A positive input causes an increase in integrator output, while a negative input causes a decrease. The truth tables for the switches 505,507 are shown in FIG. 5.

The limiters 502,504 act to limit the outputs of their respective integrators 501,503 to the required values of $T_p$ and $T_c$.

A transfer to lean burn combustion mode is triggered when the secondary flow logic 319 outputs a logical TRUE signal to both switches 505,507. Switch 505 prompts integrator/limiter combination 501/502 to increase its output from an initial value of T3 until $T_p$ reaches 1850° K. Simultaneously, switch 507 prompts integrator/limiter combination 503/504 to decrease its output and thereby reduce $T_c$ from 2400° K. to T3.

A transfer to diffusion flame combustion mode is triggered when the secondary flow logic 319 outputs a logical FALSE signal to switches 505,507, prompting the reverse of the above signal ramping process to occur.

If during a transfer between combustion modes the temperature outputs $T_p$ and $T_c$ have not reached their respective datum limit values before the secondary flow logic requires a transfer back to the prior combustion mode, the new command to transfer is ignored until the first change in temperature limits has been completed. Only when a logic signal 325 is input to the secondary flow logic 319 will the datum transfer automatically override any other command to select $T_c$ to 2400° K. and $T_p$ to T3. Logic signal 325 only occurs when the engine's bleed valves are detected in the open condition during a sudden power reduction.

The integration rates of the two integrators 501,503 must be identical to ensure no power loss during combustion mode transfer and also to ensure that the primary stage combustion temperature remains within its operating limits.

Secondary Flow Logic

The logical processes associated with the secondary flow logic module 319 are shown in detail in FIG. 6. They ensure that pollution is minimised and that the engine can meet the required load. This is achieved by monitoring the output of summing junction 330, which is the fuel demand signal $F_{ds}$ representing the fuel flow to the secondary combustion stage needed to sustain the load requirements when the primary stage is operating in the lean burn combustion mode.

However, operation of the secondary stage with fuel flows which are too small would cause combustion temperatures to become too low, with excessive CO and UHC emissions. Consequently, the secondary flow logic 319 contains a minimum secondary temperature comparator (not illustrated, but see FIG. 8, reference number 360, for a similar logical unit used in connection with the tertiary combustion stage), which receives a temperature signal $T_s$ from a secondary combustion minimum temperature controller 327, as well as a temperature signal $T_{smin}$, which is set to a constant value of 1600° K.

The secondary combustion minimum temperature controller 327 has four inputs, namely combustor inlet temperature T3, humidity H, the air mass flow $M_s$ to the combustor secondary zone and the total fuel demand signal for the secondary stage, $F_{ds}$. These are used to determine the fuel/air ratio and hence the combustion temperature $T_s$ achieved by the current fuel flow scheduled to the secondary injectors 104.

Thus, whenever the temperature comparator is enabled by a signal $F_{ds}$ from summing junction 330 and detects that the output $T_s$ of the temperature controller 327 is less than $T_{smin}$, a logical FALSE signal is output from the secondary flow logic 319 to the temperature datum selector 318, whereby diffusion flame combustion mode is selected and transfer from lean burn mode is begun as described previously.

Figure 7:
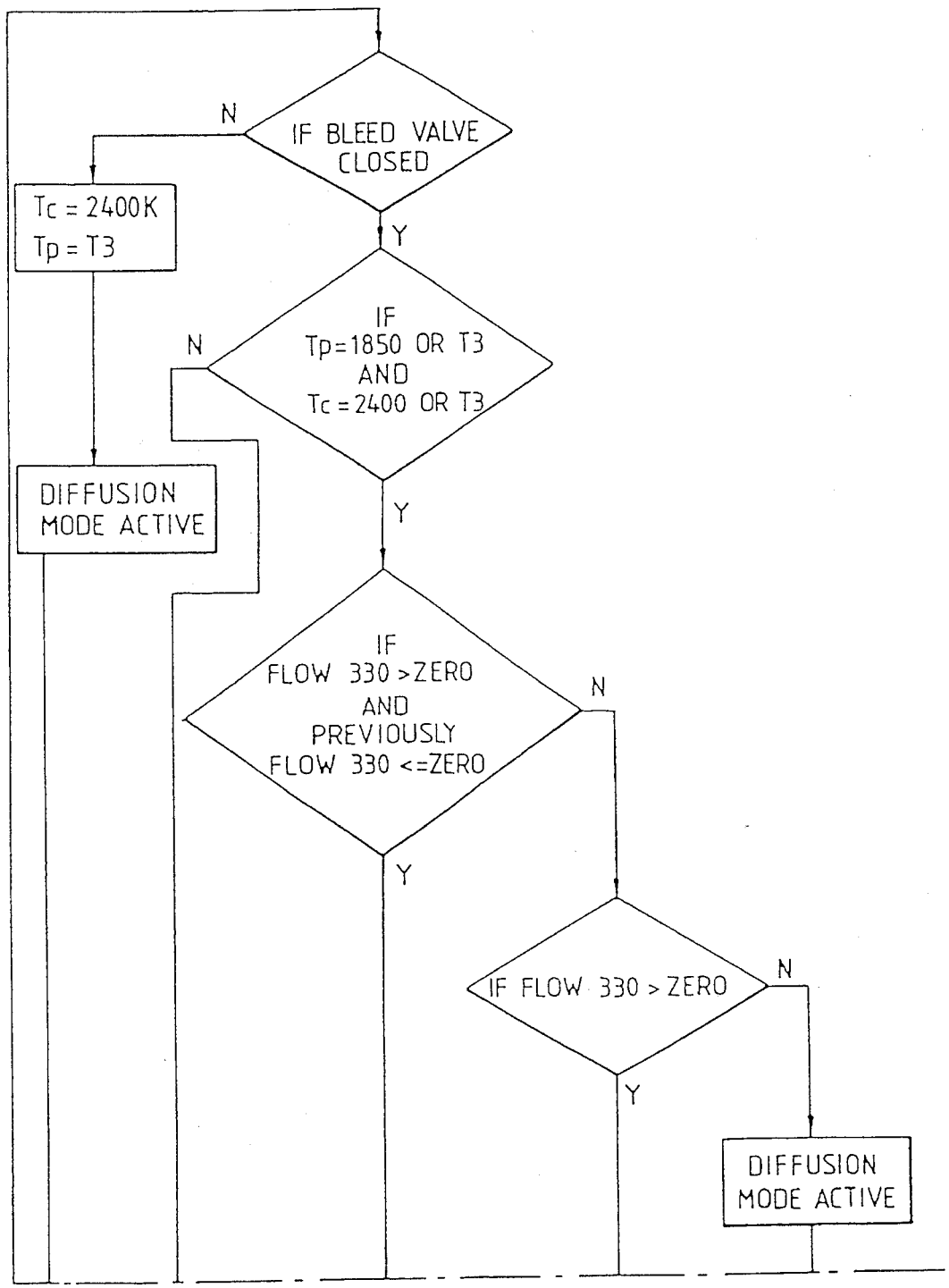
Figure 7:
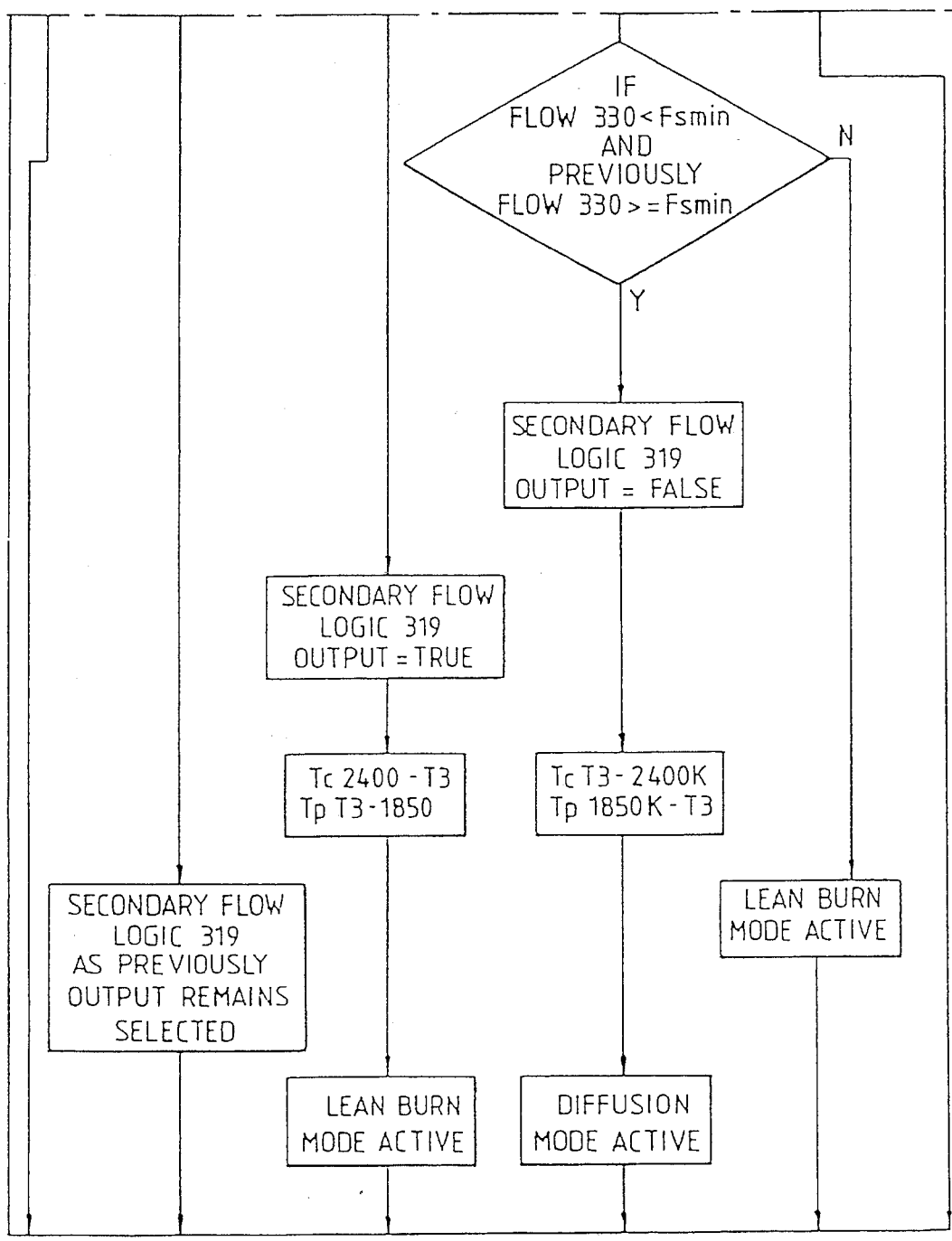

The detailed secondary flow logic for an alternative embodiment is shown in FIG. 7, the only difference from FIG. 6 being in the comparison step after detection of a fuel demand signal output from summing junction 330.

In the alternative embodiment, the secondary flow logic 319 incorporates a minimum secondary fuel demand comparator (instead of the above temperature comparator). The fuel demand comparator is enabled when it receives the fuel demand signal $F_{ds}$ output from summing junction 330. It receives for comparison a fuel demand signal which is output from the secondary combustion minimum temperature controller 327 instead of the temperature signal $T_s$, as well as a minimum fuel demand signal $F_{dsmin}$, which is set to a constant value.

Whenever the fuel demand comparator detects that the fuel demand signal from controller 327 is below fuel demand signal $F_{dsmin}$, a logical FALSE signal is output from comparator 509 to the temperature datum selector 318, so that diffusion flame combustion mode is selected and transfer from lean burn mode is begun as described previously.

Conversely, whenever the output from controller 327 is above $T_{smin}$, or $F_{dsmin}$, a logical TRUE signal is output from comparator 509 to the temperature datum selector 318, so that diffusion flame combustion mode is deselected and transfer to lean burn mode is begun as described previously.

Control of Added Tertiary Combustion Stage

If a three stage combustor is required to obtain a wider power range in the lean burn mode, the control system described so far must be modified as indicated in FIG. 3.

The modifications firstly comprise a lowest wins gate 334 for the secondary stage, so that the output of the summing junction 330 can be voted with the output of a secondary combustion temperature controller 332. The output of the lowest wins gate 334 is fed forward to a further summing junction 340, as is the output of the previous summing junction 330, so that the output of summing junction 340 is the difference signal $F_{dT}-F_{dp}-F_{ds}=F_{dt}$, the fuel demand signal for the tertiary combustion stage.

Secondary combustion temperature controller 332 is similar to the two previously described controllers 317 and 322, its inputs being T3, $M_s$ (the air mass flow to the secondary combustor stage), and $T_s$, the relevant current value for secondary combustion temperature. This is input from a secondary combustion datum selector 343. $T_s$ has a fixed maximum limit of about 1800° K. when the tertiary stage is not active, but can be modulated between a minimum limit of 1600° K. and a maximum limit of about 1800° K. when the tertiary stage is active. The fixed limit is defined as a fixed input 345 to the secondary combustion temperature datum selector 343, the range being a variable input 346 from a tertiary minimum combustion temperature controller 347.

The temperature datum selector 343 is triggered by an input 348 from a tertiary flow logic 349. Whenever it is enabled by a fuel demand signal $F_{dt}$ from summing junction 340, the tertiary flow logic 349 performs a comparison between a temperature input 350, this being the range output of temperature controller 347, and a temperature input 351, which is the output $T_t$ of a tertiary combustion minimum limit temperature controller 352.

The tertiary combustion minimum limit temperature controller 352 has four inputs, namely combustor inlet temperature T3, humidity H, the air mass flow $M_t$ to the combustor tertiary zone and the total fuel demand signal for the tertiary stage, $F_{dt}$. These are used to determine the fuel/air ratio and hence the combustion temperature $T_t$ achieved by the current fuel flow scheduled to the tertiary injectors 146.

The signal $T_t$ from temperature controller 352 is also fed to an input 853 of the temperature controller 347 for comparison with a fixed temperature input 863, $T_{tmin}=1600°$ K. representing the lowest allowable value of combustion temperature in the tertiary stage.

As shown in FIG. 8, the temperature controller 347 comprises a minimum tertiary temperature comparator 360 with inputs 863 and 853. When the comparison generates an output 361, an integrator/limiter combination 865/867 generates the temperature range output 346.

Detailed operation of the above control logic associated with the tertiary stage can be further understood by referring to FIGS. 8 and 9 and also by referring to the description of the similar logic associated with the secondary combustion stage.

Operation of the control system for the three stage combustor will now be described for a regime of increasing load, assuming an initial condition of two stage combustion.

While the total fuel demand $F_{dT}$ increases with increasing power turbine load, and with fuel demand $F_{dc}$ remaining at zero, the fuel demand output signal $F_{dp}$ to the main primary FMU 352 will be controlled from the primary lean burn combustion temperature controller 322 when $F_{dT}>F_{dp}$. The difference signal $F_{dT}-F_{dp}$ will therefore be input to the lowest wins gate 334 and will also be the output value $F_{ds}$ to the secondary fuel metering unit 353, until such time as $F_{dT}-F_{dp}$ becomes greater than or equal to the output of the secondary combustion temperature controller 332. At this point, the total fuel demand cannot be accommodated by the primary and secondary stages alone. Thus, in order that the power turbine load can be met, the tertiary combustion stage is activated.

To this end, the third summing junction 340 receives respective inputs from the second summing junction 330 and the secondary lowest wins gate 334 and thereby subtracts the fuel demand output signal $F_{ds}$ from the fuel demand output signal $F_{dT}-F_{dp}$. The resulting difference signal $F_{dt}$ directly controls the FMU 354 for the tertiary combustion stage. Clearly, as the total fuel demand increases further, $F_{dt}$ will also increase.

Operation of the tertiary stage with low fuel flows has similar results to that described above in relation to the secondary stage, and as already mentioned it is also required to change or modulate the value of secondary combustion temperature $T_s$ according to the current status of tertiary combustion. Therefore, the logical functions 343, 347, 349 and 352 already mentioned must operate as shown in more detail in FIGS. 8 and 9, with reference to FIG. 3.

Concurrent Use of Diffusion Flame Combustion Mode and Secondary Stage

At some ambient conditions, it may be that even the higher $T_c$ datum point of 2400° K. will not allow the total fuel demand output signal $F_{dT}$ to be accommodated by the primary diffusion flame combustion process. In this case, the excess fuel demand is met by the secondary combustion stage, the fuel demand output signal $F_{dp}$ still being zero because $T_p$ is still set at the value of T3 (it will be realised that $F_{dp}$ must remain at zero until the air mass flow and T3 have increased sufficiently). Hence, the output of the summing Junction 330 will be a fuel demand, $F_{dt}-F_{dc}=F_{ds}$ for combustion in the secondary stage until the lean burn combustion mode is selected.

Consider now how the control system for the three stage combustor responds to a decrease in power turbine load, starting from a condition in which the primary, secondary and tertiary combustion stages are operating..

In this case, the output of controller 314 will reduce, causing a small decrease $F_{dT}-\delta$ in total fuel demand. The outputs of both the controllers 322 and 332 will remain constant until their input parameters respond. Therefore, the fuel demand output signal $F_{dt}$ received by the tertiary FMU 354 will be $F_{dT}-\delta-F_{dp}-F_{ds}$.

This reduction in total fuel flow to the engine reduces mass flow through the engine and hence in turn reduces T3. Both primary and secondary combustion zone air flows will also reduce, so that when a new steady state is reached, $F_{dt}$ will have reduced even further. Subsequent reductions in total fuel demand will eventually produce an output from summing Junction 340 of zero, so that the tertiary stage will be shut down.

Further reductions in fuel demand will mostly be accommodated by the secondary stage, as the input from summing Junction 330 will be lower than output 333 of the secondary combustion temperature controller 332. The fuel demand output signal of the main primary combustion temperature controller 322 will only reduce when both T3 and the primary combustion stage airflow decrease.

Deceleration of the engine can continue until the point where the engine bleed valves Just remain closed, and/or a minimum power output in low emission combustion mode is required, or low emission mode is deselected.

To reduce power output below such a minimum operating point, combustion temperature control limits $T_c$ and $T_p$ must be changed to transfer primary combustion stage fuelling from lean burn mode to the more stable diffusion controlled mode using the central injectors 86.

Thus, $T_p$ is ramped from 1850° K. down to the current value of T3 and $T_c$ is ramped up from T3 to 2400° K. for the present embodiment, or to 1800° K. for low emissions if a wide enough stability margin can be achieved.

Further decelerations of the engine will produce further reductions in fuel demand until the primary diffusion combustion temperature controller's output 316 ceases to control the output of lowest wins gate 315, this being when $F_{dT}$ is less than output 316.

It should be noted from FIG. 3 that the secondary flow logic 319 has an input 1001 shown as a dashed line, being the fuel demand signal output from summing junction 320. This indicates an alternative embodiment for the logic associated with operation of the primary and secondary stages. The alternative logic can be understood from FIGS. 10 and 11.

There may be occasions when the diffusion flame combustion temperature limit in the primary stage restricts operation of the stage. If this does not overlap with the lean burn mode of combustion when this is fully operational, the secondary lean burn combustion stage can be used concurrently with the diffusion flame combustion mode.

To ensure that the secondary stage has sufficient flow to operate without producing excessive emissions, the diffusion flame combustion limit datum is rest to a lower value $T_c max2$ from $T_c max1$ to ensure sufficient flow is provided to the secondary stage. Thus whenever the fuel demand signal from junction 330 is detected, and the engine is below the minimum conditions for full lean burn combustion mode, the diffusion flame combustion temperature limit is reset by the logic switch in the datum selector 318 when triggered by the secondary flow logic.

It is important to note that the values given above for the various temperature datums $T_c$, $T_s$, $T_p$ and $T_t$ are only approximate and may vary with different combustor and fuel characteristics by as much as 50° K.

It will have been noticed from the above description that the control system here suggested has a number of logic stages, each logic stage controlling fuel demand for a corresponding stage of combustion. Further logic is necessary to facilitate changeover of combustion mode and parallel operation of both modes in the primary stage. A typical logic stage has an input for receiving a fuel demand signal from preceding control logic, a combustion temperature controller, a first output for a stage fuel demand signal for controlling fuel flow to the corresponding combustion stage, a second output for feeding forward to the next logic stage a fuel demand difference signal derived by evaluating the difference between the input fuel demand signal and the stage fuel demand signal and a third output for feeding the stage fuel demand signal forward to the next logic stage. However, if the logic stage being considered is adapted to control a lean burn combustion process which can be run in parallel with a diffusion flame combustion process controlled by a preceding logic stage, the second output may be the fuel demand difference signal from the preceding logic stage. The second and third outputs are of course contingent on the presence of a further stage forward of the stage being considered.

We claim:

1. A method of scheduling fuel flow to a plurality of combustion stages in a combustion turbine engine, comprising the steps of putting a plurality of engine fuel flow governors in parallel with each other, letting the governor which outputs the lowest fuel demand signal be the one which schedules the total fuel flow to the engine, defining predetermined temperature limits for the combustion process in each stage of combustion, and individually scheduling fuel flows to the plurality of combustion stages to achieve the lowest fuel flows consistent with the predetermined temperature limits for the corresponding stages of combustion, wherein a primary combustion stage is operated sequentially in a diffusion flame first combustion mode and in a lean burn second combustion mode and a secondary combustion stage and any further combustion stages are operated in a lean burn combustion mode.

2. A control system for scheduling fuel flow to a plurality of combustion stages in a combustion turbine engine, comprising;

a plurality of engine fuel flow governors arranged to output fuel demand signals in parallel with each other, lowest wins means for receiving the fuel demand signals and outputting the lowest fuel demand signal for scheduling the total fuel flow to the engine, and a plurality of control logic stages corresponding to the plurality of combustion stages, the logic stages including means defining predetermined temperature limits for corresponding stages;

the control logic stages being adapted to individually schedule fuel demand signals to corresponding combustion stages to achieve the lowest fuel flows consistent with the predetermined temperature limits for the corresponding stages of combustion;

wherein a primary combustion stage is adapted to operate sequentially in a diffusion flame first combustion mode and in a lean burn second combustion mode and a secondary combustion stage and any further combustion stages are adapted to operate in a lean burn combustion mode.

3. A control system for controlling fuel flow to at least primary and secondary combustion stages arranged in flow series in a combustion turbine engine, the primary combustion stage being adapted to operate in a diffusion flame first combustion mode and a lean burn second combustion mode and the secondary and any further combustion stages being adapted to operate in a lean burn combustion mode, wherein the control system comprises:

first combustion mode control logic means for outputting a first combustion mode fuel demand signal ($F_{dc}$) to the primary combustion stage during operation in its first combustion mode, second combustion mode control logic means for outputting respective second combustion mode fuel demand signals ($F_{dp}$, $F_{ds}$, $F_{dt}$) to the primary combustion stage and at least one further combustion stage during operation of the primary combustion stage in its second combustion mode, and further control logic means for scheduling the first and second combustion mode fuel demand signals ($F_{dc}$, $F_{dp}$) to the primary combustion stage to achieve therein changeover between and simultaneous operation of the first and second combustion modes.

4. A control system according to claim 3, having a plurality of engine fuel flow governors arranged to output fuel demand signals in parallel with each other, a lowest wins means for receiving the fuel demand signals and outputting the lowest fuel demand signal as a total fuel demand signal ($F_{dT}$) for setting the total fuel flow to the engine, and control logic means for dividing the total fuel demand signal ($F_{dT}$) among the combustion stages thereby to achieve the lowest fuel flows consistent with predetermined temperature limits for each combustion stage.

5. A control system according to claim 3, in which the second combustion mode control logic means includes a combustion temperature controller having means for generating a second combustion mode fuel demand signal ($F_{dp}$) for controlling fuel flow to the primary combustion stage to substantially maintain a predetermined temperature of combustion which prevents significant formation of NOx during operation of the primary combustion stage in its second combustion mode.

6. A control system according to claim 3, having engine governor control logic means for generating a total fuel demand signal ($F_{dp}$), the first combustion mode control logic means comprising:

a combustion temperature controller having means for generating a datum fuel demand signal to produce a temperature rise equal to the difference between a diffusion flame upper temperature limit ($T_c$) and the temperature ($T_3$) of the air at the commencement of the combustion process, lowest wins means for comparing the datum fuel demand signal with the total fuel demand signal ($F_{dt}$) and outputting the lower fuel demand signal as a first combustion mode fuel demand signal ($F_{dc}$) to control fuel flow to the primary combustion stage, and means for outputting a first combustion mode difference signal to the second combustion mode control logic means, the first combustion mode difference signal representing the difference between the total fuel demand signal ($F_{dT}$) and the first combustion mode fuel demand signal ($F_{dc}$).

7. A control system according to claim 6, the second combustion mode control logic means having means for outputting a second combustion mode difference signal for controlling fuel flow to the secondary combustion stage, the second combustion mode difference signal representing the difference between the first combustion mode difference signal and the second combustion mode fuel demand signal ($F_{dp}$) for the primary stage.

8. A control system according to claim 6, in which the second combustion mode control logic means includes a combustion temperature controller having means for generating a datum fuel demand signal for controlling fuel flow to the primary combustion stage to maintain a predetermined temperature of lean burn combustion which prevents significant formation of NOx during operation of the primary combustion stage in the second combustion mode, lowest wins means for comparing the datum fuel demand signal with the first combustion mode difference signal and outputting the lower fuel demand signal as a second combustion mode fuel demand signal ($F_{dp}$) to control fuel flow to the primary combustion stage.

9. A control system according to claim 7, in which the second combustion mode control logic means includes a combustion temperature controller having means for generating a datum fuel demand signal for controlling fuel flow to the secondary stage to maintain a predetermined temperature of combustion which prevents significant formation of NOx during operation of the secondary combustion stage, and lowest wins means for comparing the datum fuel demand signal with the second combustion mode difference signal and outputting the lower fuel demand signal as a secondary stage fuel demand signal ($F_{ds}$) for controlling fuel flow to the secondary combustion stage.

10. A control system according to claim 9, the second combustion mode control logic means having means for outputting a secondary stage difference signal ($F_{dt}$) for controlling fuel flow to a tertiary combustion stage, the secondary stage difference signal representing the difference between the second combustion mode difference signal and the secondary stage fuel demand signal ($F_{ds}$).

* * * * *

UNITED STATES PATENT AND TRADEMARK OFFICE
CERTIFICATE OF CORRECTION

PATENT NO. : 5,469,700
DATED : November 28, 1995
INVENTOR(S) : Charles C. CORBETT et al.

It is certified that error appears in the above-indentified patent and that said Letters Patent is hereby corrected as shown below:

ON THE COVER PAGE

After [86] § 371 Date: change "July 7, 1994" to --April 7, 1994--.

After [86] § 102(e) Date: change "July 7, 1994" to --April 7, 1994--.

Signed and Sealed this

Twenty-seventh Day of February, 1996

Attest:

BRUCE LEHMAN

*Attesting Officer*   *Commissioner of Patents and Trademarks*